(12) United States Patent
 Ambrogio et al.

(10) Patent No.: US 12,547,884 B2
(45) Date of Patent: Feb. 10, 2026

(54) HARDWARE IMPLEMENTATION OF ACTIVATION FUNCTIONS

(71) Applicant: International Business Machines Corporation, Armonk, NY (US)

(72) Inventors: Stefano Ambrogio, San Jose, CA (US); Pritish Narayanan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 17/701,809

(22) Filed: Mar. 23, 2022

(65) Prior Publication Data

US 2023/0306251 A1    Sep. 28, 2023

(51) Int. Cl.
  *G06N 3/065* (2023.01)
  *G06N 3/048* (2023.01)
  *G11C 13/00* (2006.01)

(52) U.S. Cl.
  CPC ............ *G06N 3/065* (2023.01); *G06N 3/048* (2023.01); *G11C 13/0061* (2013.01)

(58) Field of Classification Search
  CPC ...... G06N 3/065; G06N 3/0635; G06N 3/048; G06N 3/0481; G11C 13/0061
  See application file for complete search history.

(56) References Cited

U.S. PATENT DOCUMENTS

| | | | |
|---|---|---|---|
| 9,904,874 B2 | 2/2018 | Shoaib et al. | |
| 2017/0132496 A1* | 5/2017 | Shoaib | G06N 3/048 |
| 2019/0147323 A1* | 5/2019 | Li | G06N 3/048 706/15 |

(Continued)

FOREIGN PATENT DOCUMENTS

CN    106650922 B    5/2019

OTHER PUBLICATIONS

Giordano, Massimo, et al. "Analog-to-digital conversion with reconfigurable function mapping for neural networks activation function acceleration." IEEE Journal on Emerging and Selected Topics in Circuits and Systems 9.2 (2019): 367-376. (Year: 2019).*
Li, Jiwei, et al. "In situ learning in hardware compatible multilayer memristive spiking neural network." IEEE Transactions on Cognitive and Developmental Systems 14.2 (2021): 448-461. (Year: 2021).*

(Continued)

*Primary Examiner* — Randall K. Baldwin
(74) *Attorney, Agent, or Firm* — Kimberly Zillig; Ryan, Mason & Lewis, LLP

(57) ABSTRACT

A device comprises activation function circuitry configured to implement a non-linear activation function. The activation function circuitry comprises a comparator circuit, a capacitor, and a ramp voltage generator circuit. The capacitor comprises a terminal coupled to a first input terminal of the comparator circuit, and is configured to receive and store an input voltage which corresponds to an input value to the non-linear activation function. The ramp voltage generator circuit is configured to generate a ramp voltage which is applied to a second input terminal of the comparator circuit. The comparator circuit is configured to compare, during a conversion period, the stored input voltage to the ramp voltage, and generate a voltage pulse based on a result of the comparing. The voltage pulse comprises a pulse duration which encodes an activation output value of the non-linear activation function based on the input value to the non-linear activation function.

20 Claims, 15 Drawing Sheets

(56) References Cited

U.S. PATENT DOCUMENTS

| | | | |
|---|---|---|---|
| 2020/0272893 A1* | 8/2020 | Danial | G06N 3/02 |
| 2021/0142156 A1* | 5/2021 | Tran | G06N 3/048 |
| 2022/0215239 A1* | 7/2022 | Tran | G11C 16/10 |
| 2024/0028884 A1* | 1/2024 | Moran | H10B 43/00 |

OTHER PUBLICATIONS

Chandrasekaran, Sanjeev Tannirkulam, et al. "Fully integrated analog machine learning classifier using custom activation function for low resolution image classification." IEEE Transactions on Circuits and Systems I: Regular Papers 68.3 (2021): 1023-1033. (Year: 2021).*

Maliuk, Dzmitry, and Yiorgos Makris. "An experimentation platform for on-chip integration of analog neural networks: A pathway to trusted and robust analog/RF ICs." IEEE transactions on neural networks and learning systems 26.8 (2014): 1721-1734. (Year: 2015).*

Cristiano, Giorgio, et al. "Perspective on training fully connected networks with resistive memories: Device requirements for multiple conductances of varying significance." Journal of Applied Physics (2018). (Year: 2018).*

Krestinskaya, Olga, Khaled Nabil Salama, and Alex Pappachen James. "Learning in memristive neural network architectures using analog backpropagation circuits." IEEE Transactions on Circuits and Systems I: Regular Papers 66.2 (2018): 719-732. (Year: 2018).*

Gnawali, Krishna Prasad, et al. "Reliability enhancements in memristive neural network architectures." IEEE Transactions on Nanotechnology 18 (2019): 866-878. (Year: 2019).*

S. Oh et al., "Energy-efficient Mott Activation Neuron for Full-hardware Implementation of Neural Networks," Nature Nanotechnology, vol. 16, No. 6, Jun. 2021, pp. 680-687.

S. S. Vuppala, "Analog Implementation of a Current-Mode Rectified Linear Unit (ReLU) for Artificial Neural Networks," Doctoral dissertation, The University of Texas at Austin, May 2019, 68 pages.

K. Givaki et al., "On the Resilience of Deep Learning for Reduced-voltage FPGAs," In 2020 28th Euromicro International Conference on Parallel, Distributed and Network-Based Processing, Mar. 2020, pp. 110-117.

Z. Wan et al., "Accuracy and Resiliency of Analog Compute-in-Memory Inference Engines," arXiv preprint arXiv:2008.02400, Aug. 5, 2020, 21 pages.

P. Mell et al., "The NIST Definition of Cloud Computing," Recommendations of the National Institute of Standards and Technology, Special Publication 800-145, Sep. 2011, 7 pages.

* cited by examiner

600

1300

HARDWARE IMPLEMENTATION OF ACTIVATION FUNCTIONS

BACKGROUND

This disclosure relates generally to analog resistive processing systems for neuromorphic computing, and techniques for implementing and calibrating hardware activation functions for neuromorphic computing systems. Information processing systems and artificial intelligence (AI) systems such as neuromorphic computing systems and artificial neural network systems are utilized in various applications such as machine learning and inference processing for cognitive recognition, etc. Such systems are hardware-based systems that generally include a large number of highly interconnected processing elements (referred to as "artificial neurons") which operate in parallel to perform various types of computations. The artificial neurons (e.g., pre-synaptic neurons and post-synaptic neurons) are connected using artificial synaptic devices which provide synaptic weights that represent connection strengths between the artificial neurons. The synaptic weights can be implemented using an array of resistive processing unit (RPU) cells having tunable resistive memory devices (e.g., tunable conductance), wherein the conductance states of the RPU cells are encoded or otherwise mapped to the synaptic weights. Furthermore, in an artificial neural network, each artificial neuron implements an activation function which is configured to, e.g., transform the inputs to the artificial neuron into an output value or "activation" of the given artificial neuron.

SUMMARY

Exemplary embodiments of the disclosure provide techniques for implementing and calibrating hardware activation functions for, e.g., neuromorphic computing systems. In an exemplary embodiment, a device comprises activation function circuitry which is configured to implement a non-linear activation function. The activation function circuitry comprises a comparator circuit, a capacitor, and a ramp voltage generator circuit. The comparator comprises a first input terminal, a second input terminal, and an output terminal. The capacitor comprises a terminal coupled to the first input terminal of the comparator circuit. The capacitor is configured to receive and store an input voltage which corresponds to an input value to the non-linear activation function. The ramp voltage generator circuit is configured to generate a ramp voltage which is applied to the second input terminal of the comparator circuit. The comparator circuit is configured to compare, during a conversion period, the input voltage stored in the capacitor to the ramp voltage, and generate a voltage pulse on the output terminal based on a result of the comparing during the conversion period. The voltage pulse comprises a pulse duration which encodes an activation output value of the non-linear activation function based on the input value to the non-linear activation function.

Other embodiments will be described in the following detailed description of exemplary embodiments, which is to be read in conjunction with the accompanying figures.

DETAILED DESCRIPTION

Exemplary embodiments of the disclosure will now be described in further detail with regard to systems, hardware circuitry, and methods for implementing and calibrating hardware activation functions for neuromorphic computing systems. It is to be understood that the various features shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration." Any embodiment or design described herein as "exemplary" is not to be construed as preferred or advantageous over other embodiments or designs.

Further, it is to be understood that the phrase "configured to" as used in conjunction with a circuit, structure, element, component, or the like, performing one or more functions or otherwise providing some functionality, is intended to encompass embodiments wherein the circuit, structure, element, component, or the like, is implemented in hardware, software, and/or combinations thereof, and in implementations that comprise hardware, wherein the hardware may comprise discrete circuit elements (e.g., transistors, inverters, etc.), programmable elements (e.g., application specific integrated circuit (ASIC) chips, field-programmable gate array (FPGA) chips, etc.), processing devices (e.g., central processing units (CPUs), graphics processing units (GPUs), etc.), one or more integrated circuits, and/or combinations thereof. Thus, by way of example only, when a circuit, structure, element, component, etc., is defined to be configured to provide a specific functionality, it is intended to cover, but not be limited to, embodiments where the circuit, structure, element, component, etc., is comprised of elements, processing devices, and/or integrated circuits that enable it to perform the specific functionality when in an operational state (e.g., connected or otherwise deployed in a system, powered on, receiving an input, and/or producing an output), as well as cover embodiments when the circuit, structure, element, component, etc., is in a non-operational state (e.g., not connected nor otherwise deployed in a system, not powered on, not receiving an input, and/or not producing an output) or in a partial operational state.

Figure 1:
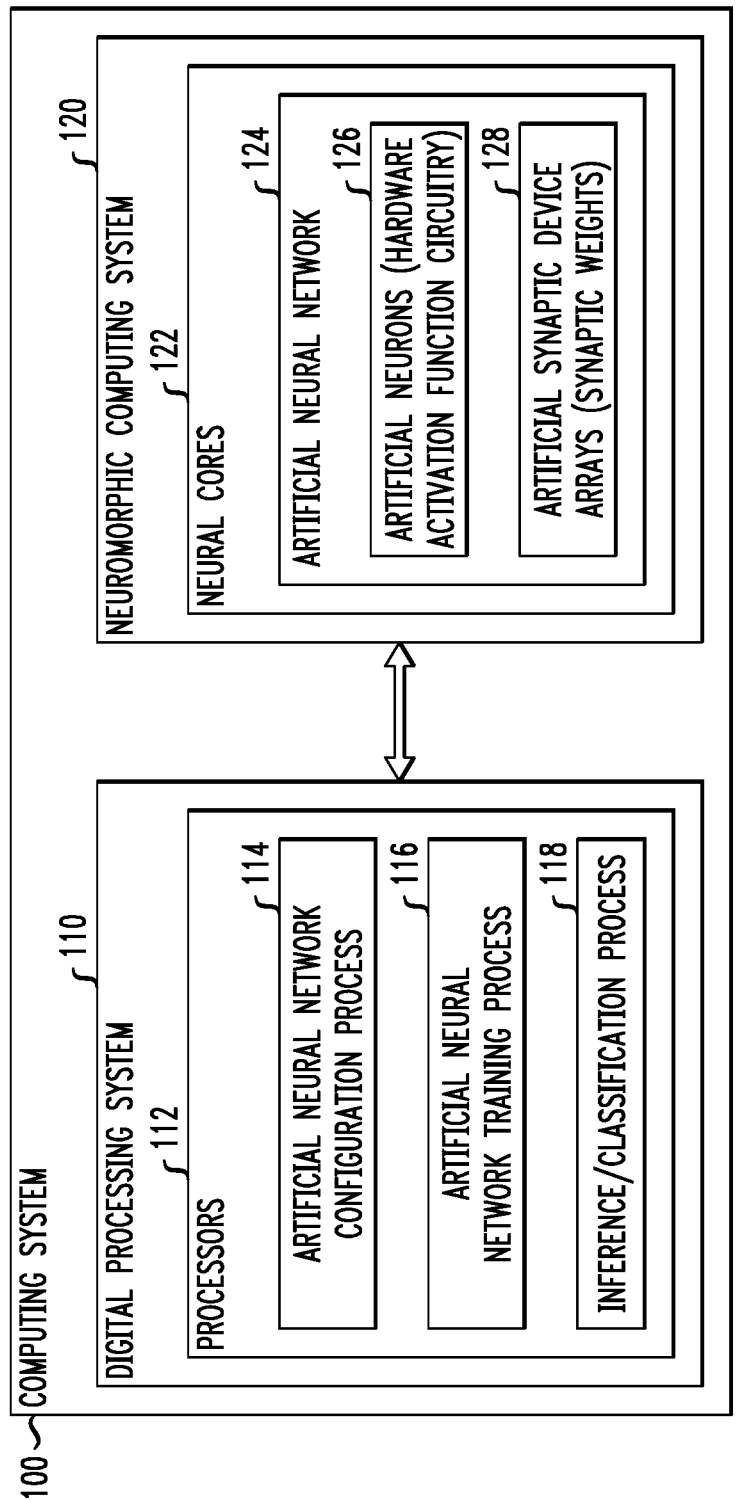
FIG. 1 schematically illustrates a computing system which is configured to perform neuromorphic computing using hardware-implemented activation functions, according to an exemplary embodiment of the disclosure.

FIG. 1 schematically illustrates a computing system which is configured to perform neuromorphic computing using hardware-implemented activation functions, according to an exemplary embodiment of the disclosure. In particular, FIG. 1 schematically illustrates a computing system 100 which comprises a digital processing system 110, and a neuromorphic computing system 120. The digital processing system 110 comprises a plurality of processors 112. The neuromorphic computing system 120 comprises one or more neural cores 122. The neural cores 122 are configured to implement an artificial neural network 124 which comprises artificial neurons 126 (alternatively referred to as nodes 126) that process information in the artificial neural network 124, and artificial synaptic device arrays 128 which provide connections between the nodes 126 to transfer electrical signals between the nodes 126 using analog circuitry (e.g., analog RPU systems).

The digital processing system 110 executes various processes through the execution of program code by the processors 112 to support neuromorphic computing applications. For example, such processes include, but are not limited to, an artificial neural network configuration process 114, an artificial neural network training process 116, and an inference/classification process 118, the functions of which will be explained in further detail below. The processors 112 may include various types of processors that perform processing functions based on software, hardware, firmware, etc. For example, the processors 112 may comprise any number and combination of CPUs, ASICs, FPGAs, GPUs, Microprocessing Units (MPUs), deep learning accelerator (DLA), artificial intelligence (AI) accelerators, and other types of specialized processors or coprocessors that are configured to execute one or more fixed functions.

The artificial neural network configuration process 114 implements methods for configuring the neural cores 122 of the neuromorphic computing system 120 to implement an architecture of the artificial neural network 124. For example, in some embodiments, the artificial neural network configuration process 114 communicates with a programming interface of the neuromorphic computing system 120 to configure layers of artificial neurons 126, the artificial synaptic device arrays 128 (e.g., analog RPU arrays) that connect the layers of artificial neurons 126, and a routing system of the neuromorphic computing system 120 to enable on-chip and/or chip-to-chip communication between the hardware blocks that implement the artificial neural network 124. The artificial neural network 124 can be any type of neural network including, but not limited to, a feed-forward neural network (e.g., a Deep Neural Network (DNN), a Convolutional Neural Network (CNN), etc.), a Recurrent Neural Network (RNN) (e.g., a Long Short-Term Memory (LSTM) neural network), etc.

In general, the artificial neural network 124 comprises a plurality of layers (neuron layers), wherein each layer comprises multiple artificial neurons 126. The neuron layers include an input layer, an output layer, and one or more hidden model layers between the input and output layers, wherein the number of neuron layer and configuration of the neuron layers (e.g., number of constituent artificial neurons) will vary depending on the type of neural network that is implemented. Each neuron layer is connected to another neuron layer using one of the artificial synaptic device arrays 128 which provide synaptic weights that represent connection strengths between artificial neurons in one layer with the artificial neurons in another layer.

The input layer of the artificial neural network 124 comprises artificial input neurons, which receive data that is input to the artificial neural network for further processing by one or more subsequent hidden model layers of artificial neurons. The hidden layers perform various computations, depending on type and framework of the artificial neural network 124. The output layer (e.g., classification layer) produces the output results (e.g., classification/predication results) for the given input data. Depending on the type of artificial neural network, the layers of the artificial neural network 124 can include, e.g., fully connected layers, activation layers, convolutional layers, pooling layers, normalization layers, etc.

In the artificial neural network 124, each artificial neuron 126 implements an activation function which defines an output of the node given an input or set of inputs to the node. For example, depending on the given application and the type of artificial neural network 124, the activation functions implemented by the artificial neurons 126 can include one or more types of non-linear activation functions including, but not limited to, a rectified linear unit (ReLU) activation function, a clamped ReLU activation function, a sigmoid activation function, a hyperbolic tangent (tanh) activation function, a softmax activation function, etc. In some embodiments, as explained in further detail below, the artificial neurons 126 comprise hardware-implemented activation functions that can be configured and calibrated to implement non-linear activation functions such as ReLU, clamped ReLU, hard sigmoid, and hard tanh activations, the details of which will be explained in further detail below in conjunction with FIGS. 5A, 5B, 5C, 5D, and 6-12.

The artificial neural network training process 116 implements methods that are configured to train the artificial neural network 124. In general, in some embodiments, training an artificial neural network involves using a set of training data and performing a process of recursively adjusting the parameters/weights of the synaptic device arrays that connect the neuron layers, to fit the set of training data in order to maximize a likelihood function that minimizes error. The training process can be implemented using non-linear optimization techniques such as gradient-based techniques which utilize an error back-propagation process. For example, in some embodiments, a stochastic gradient descent (SGD) process is utilized to train artificial neural networks using the backpropagation method in which an error gradient with respect to each model parameter (e.g., weight) is calculated using the backpropagation algorithm.

As is known in the art, a backpropagation process comprises three repeating processes including (i) a forward process, (ii) a backward process, and (iii) a model parameter update process. During the training process, training data are randomly sampled into mini-batches, and the mini-batches are input to the artificial neural network to traverse the model in two phases: forward and backward passes. The forward pass processes input data in a forward direction (from the input layer to the output layer) through the layers of the network, and generates predictions and calculates errors between the predictions and the ground truth. The backward pass backpropagates errors in a backward direction (from the output layer to the input layer) through the artificial neural network to obtain gradients to update model weights. The forward and backward cycles mainly involve performing matrix-vector multiplication operations in forward and backward directions. The weight update involves performing incremental weight updates for weight values of the artificial synaptic device arrays of the artificial neural network being trained. The processing of a given mini-batch via the forward and backward phases is referred to as an iteration, and an epoch is defined as performing the forward-backward pass through an entire training dataset. The training process iterates multiple epochs until the model converges to a convergence criterion.

The inference/classification process 118 implements methods that are configured to perform inference, classification and/or AI processes using the trained artificial neural network 124 implemented in analog hardware. The inference/classification process 118 may be implemented using the trained artificial neural network 124 for applications such as machine learning and inference processing for cognitive computing tasks such as object recognition, image recognition, speech recognition, handwriting recognition, natural language processing, etc.

Figure 2:
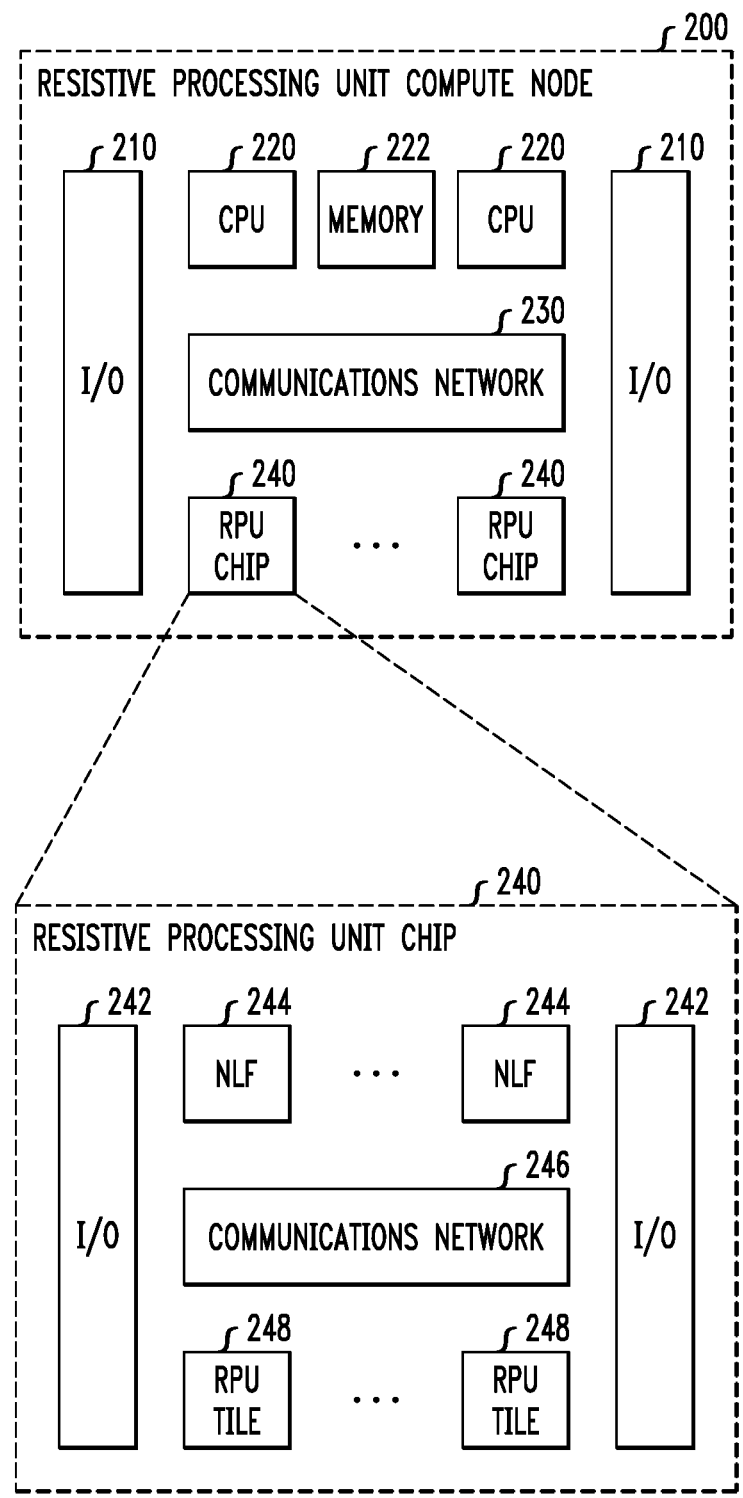
FIG. 2 schematically illustrates a resistive processing unit system comprising a plurality of resistive processing unit chips, which can be utilized to implement the computing system of FIG. 1, according to an exemplary embodiment of the disclosure.

As noted above, in some embodiments, the neuromorphic computing system 120 of FIG. 1 comprises an RPU system in which the neural cores 122 are implemented using one or more RPU compute nodes having RPU devices (e.g., RPU accelerator chips). For example, in some embodiments, the computing system 100 is implemented using an RPU computing system as shown in FIG. 2. In particular, FIG. 2 schematically illustrates an RPU compute node 200 comprising an I/O interface 210, one or more processors 220 (e.g., CPUs, GPUs, etc.), memory 222 (e.g., volatile memory, and non-volatile memory), a communications network 230, and one or more RPU chips 240. In some embodiments, as shown in FIG. 2, each RPU chip 240 comprises an I/O interface 242, a plurality of non-linear function (NLF) compute modules 244, an intranode communications network 246, and a plurality of RPU tiles 248. The I/O interface 242 comprises circuitry to enable off-chip I/O communication. Each RPU tile 248 comprises an array of RPU cells (or RPU array) and peripheral circuitry. Exemplary embodiments of the RPU tiles 248 will be described in further detail below with reference to FIGS. 3 and 4.

In some embodiments, the processors 220 comprises digital processing units of the RPU compute node 200, which execute program code that is stored in the memory 222 to perform software functions to support neuromorphic computing applications. For example, in some embodiments, the processors 220 execute program code to perform the artificial neural network configuration process 114, the artificial neural network training process 116, and the inference/classification process 118, as well as other software functions that utilize the analog RPU hardware for hardware accelerated computing. The RPU compute node 200 is configurable for different applications using different program instruction sets that are executed by the processors 220 to perform desired processes and computational tasks. In some embodiments, the processors 220 are configured to convert digital inputs/outputs to analog inputs/outputs. The processors 220 execute program code to configure, calibrate, and utilize the RPU chips 240 to perform accelerated analog computations. In some embodiments, the processors 220 are configured to move data within the given RPU compute node 200 and between different RPU compute nodes. In some embodiments, depending on the size of the hardware artificial neural network 124, two or more RPU compute nodes 200 can be utilized to implement the hardware artificial neural network 124.

On the RPU chip, the RPU tiles 248 are configured to implement synaptic device arrays, and the NLF compute modules 244 are configured as artificial neurons that implement activation functions such as hardware activation functions as discussed herein. More specifically, in some embodiments, the neuronal functionality is implemented by the NLF compute modules 244 using standard CMOS circuitry, while the synaptic functionality is implemented by the RPU tiles 248 which, in some embodiments, comprise densely integrated crossbar arrays of analog resistive memory devices. The intranode communications network 246 enables on-chip communication (between neurons and synaptic device arrays) through a bus or any suitable network-on-chip (NoC) communications framework.

Figure 3:
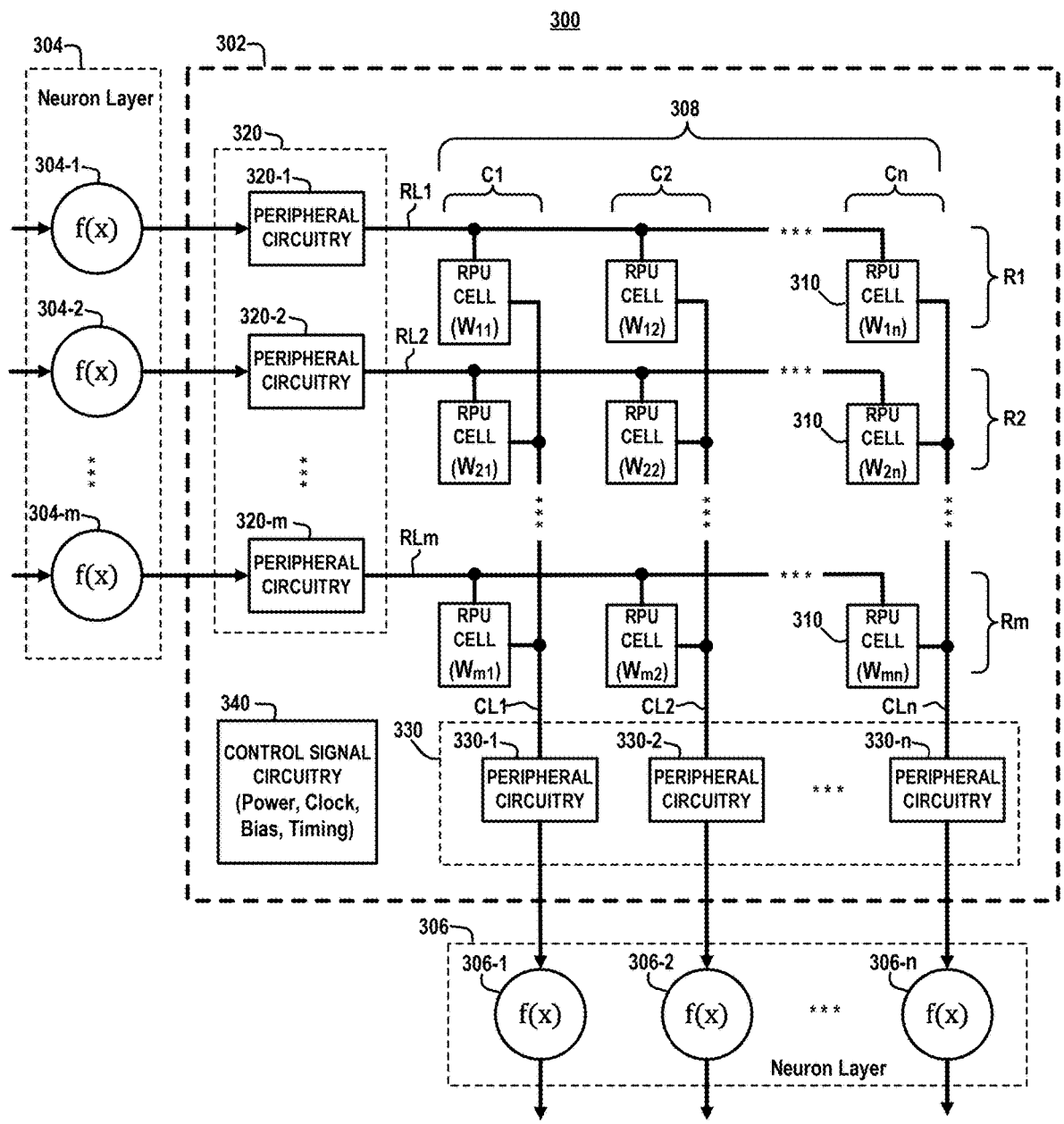
FIG. 3 schematically illustrates a resistive processing unit system which is configured to implement an artificial neural network comprising artificial neurons that implement hardware activation functions, according to an exemplary embodiment of the disclosure.

FIG. 3 schematically illustrates an RPU system 300 which is configured to implement an artificial neural network comprising artificial neurons that implement hardware activation functions, according to an exemplary embodiment of the disclosure. The RPU system 300 comprises an RPU crossbar system 302 (or RPU tile), a first neuron layer 304, and a second neuron layer 306. The first neuron layer 304 comprises a plurality of artificial neurons 304-1, 304-2, . . . , 304-$m$ (or nodes) which implement respective activation functions f (x), and the second neuron layer 306 comprises a plurality of artificial neurons 306-1, 306-2, . . . , 306-$n$ (or nodes) which implement respective activation functions f (x). In some embodiments, the first neuron layer 304 comprises an input layer or intermediate (hidden) layer of an artificial neural network, and the second layer 306 comprises an intermediate (hidden) layer or output layer of the artificial neural network, wherein the first neuron layer 304 comprises an upstream layer of artificial neurons that are coupled to the downstream second neuron layer 306 by the RPU crossbar system 302. In some embodiments, FIG. 3 schematically illustrates an exemplary architecture of the RPU chip 240 of FIG. 2, wherein the first and second neuron layers 304 and 306 are implemented using hardware NLF compute modules 244, and the RPU crossbar system 302 comprises an RPU tile 248.

As shown in FIG. 3, the RPU crossbar system 302 comprises an RPU array 308 (e.g., crossbar array) which comprises RPU cells 310 arranged in a plurality of rows R1, R2, ..., Rm, and a plurality of columns C1, C2, ..., Cn. The RPU cells 310 in each row R1, R2, ..., Rm are commonly connected to respective row lines RL1, RL2, ..., RLm (collectively, row lines RL). The RPU cells 310 in each column C1, C2, ..., Cn are commonly connected to respective column lines CL1, CL2, ..., CLn (collectively, column lines CL). Each RPU cell 310 is connected at (and between) a cross-point (or intersection) of a respective one of the row and column lines. In some embodiments, the number of rows (m) and the number of columns (n) are different, while in other embodiments, the number of rows (m) and the number of columns (n) the same (i.e., m=n). For example, in an exemplary non-limiting embodiment, the RPU array 308 comprises a 4,096×4,096 array of RPU cells 310.

The RPU crossbar system 302 further comprises peripheral circuitry 320 coupled to the row lines RL1, RL2, ..., RLm, as well as peripheral circuitry 330 coupled to the column lines CL1, CL2, ..., CLn. More specifically, the peripheral circuitry 320 comprises blocks of peripheral circuitry 320-1, 320-2, ..., 320-m (collectively peripheral circuitry 320) connected to respective row lines RL1, RL2, ..., RLm, and the peripheral circuitry 330 comprises blocks of peripheral circuitry 330-1, 330-2, ..., 330-n (collectively, peripheral circuitry 330) connected to respective column lines CL1, CL2, ..., CLn. The RPU crossbar system 302 further comprises local control signal circuitry 340 which comprises various types of circuit blocks such as power, clock, bias and timing circuitry to provide power distribution and control signals and clocking signals for operation of the peripheral circuitry 320 and 330 of the RPU crossbar system 302, as well as activation function circuitry which performs the activation functions of the first neuron layer 304, and/or the second neuron layer 306, as discussed in further detail below. While the row lines RL and column lines CL are each shown in FIG. 3 as a single line for ease of illustration, it is to be understood that each row and column line can include two or more lines connected to the RPU cells 310 in the respective rows and columns, depending on the specific architecture of the RPU cells 310, as is understood by those of ordinary skill in the art.

In some embodiments, each RPU cell 310 in the RPU crossbar system 302 comprises a resistive memory element with a tunable conductance. For example, the resistive memory elements of the RPU cells 310 can be implemented using resistive devices such as resistive switching devices (interfacial or filamentary switching devices), ReRAM, memristor devices, phase change memory (PCM) devices, and other types of resistive memory devices having a tunable conductance (or tunable resistance level) which can be programmatically adjusted within a range of a plurality of different conductance levels to tune the values (e.g., matrix values, synaptic weights, etc.) of the RPU cells 310. In some embodiments, the variable conductance elements of the RPU cells 310 can be implemented using ferroelectric devices such as ferroelectric field-effect transistor devices. Furthermore, in some embodiments, the RPU cells 310 can be implemented using an analog CMOS-based framework in which each RPU cell 310 comprises a capacitor and a read transistor. With the analog CMOS-based framework, the capacitor serves as a memory element of the RPU cell 310 and stores a weight value in the form a capacitor voltage, and the capacitor voltage is applied to a gate terminal of the read transistor to modulate a channel resistance of the read transistor based on the level of the capacitor voltage, wherein the channel resistance of the read transistor represents the conductance of the RPU cell and is correlated to a level of a read current that is generated based on the channel resistance.

For certain applications, some or all of the RPU cells 310 within the RPU array 308 comprise respective conductance values that are mapped to respective numerical matrix values of a given matrix W (e.g., computational matrix or synaptic weight matrix, etc.) that is stored in the RPU array 308. For example, for an artificial neural network application, some or all of the RPU cells 310 with the RPU array 308 serve as artificial synaptic devices that are encoded with synaptic weights of a synaptic array which connects two layers of artificial neurons of the artificial neural network. More specifically, in an exemplary embodiment, the RPU array 308 comprises an array of artificial synaptic devices which connect artificial pre-synaptic neurons (e.g., the artificial neurons of the first neuron layer 304) and artificial post-synaptic neurons (e.g., the artificial neurons of the second neuron layer 306), wherein the artificial synaptic devices provide synaptic weights that represent connection strengths between the pre-synaptic and post-synaptic neurons. As shown in FIG. 3, the weights $W_{ij}$ are in the form of a matrix, wherein i denotes the row index and j denotes the column index. While FIG. 3 shows an exemplary embodiment in which all RPU cells 310 encoded with a given weight value for a weight matrix W with a size of m×n, the RPU array 308 can be configured to store a weight matrix with a size smaller than m×n.

The peripheral circuitry 320 and 330 comprises various circuit blocks that are configured to perform functions such as, e.g., programming the conductance values of the RPU cells 310 to store encoded values (e.g., matrix values, synaptic weights, etc.), reading the programmed states of the RPU cells 310, and performing functions to support analog, in-memory computation operations such as matrix-vector multiply functions, matrix-matrix multiply functions, outer product update operations, etc., to perform various operations such as training an artificial neutral network, performing inference/classification operation using a trained neural network, etc. For example, in some embodiments, the blocks of peripheral circuitry 320-1, 320-2, ..., 320-m comprise corresponding pulse-width modulation (PWM) circuitry and associated driver circuitry, and readout circuitry for each row of RPU cells 310 of the RPU array 308. Similarly, the blocks of peripheral circuitry 330-1, 330-2, ..., 330-n comprises corresponding PWM circuitry and associated driver circuitry, and readout circuitry for each column of RPU cells 310 of the RPU array 308.

In some embodiments, the PWM circuitry and associated pulse driver circuitry of the peripheral circuitry 320 and 330 is configured to generate and apply PWM read pulses to the rows and columns of the array of RPU cells 310 in response to digital input vector values (read input values) that are received during different operations (e.g., forward pass and backward pass training operations). In some embodiments, the PWM circuitry is configured to receive a digital input vector (to be applied to rows or columns) and convert the elements of the digital input vector into analog input vector values that are represented by input voltage voltages of varying pulse width. In some embodiments, a time-encoding scheme is used when input vectors are represented by fixed amplitude Vin=1 Vpulses with a tunable duration (e.g., pulse duration is a multiple of 1 ns and is proportional to the value of the input vector). The input voltages applied to rows (or columns) generate output vector values on the columns (or rows) which are represented by output currents, wherein the output currents are processed by the readout circuitry.

For example, in some embodiments, the readout circuitry of the peripheral circuitry 320 and 330 comprises current integrator circuitry that is configured to integrate read currents ($I_{READ}$) which are output and accumulated from the rows and columns of connected RPU cells 310 and convert the integrated currents into analog voltages for subsequent computation. In particular, the currents generated by the RPU cells 310 are summed on the columns (or rows) and the summed current is integrated over a measurement time, or integration time TINT, by the readout circuitry of the peripheral circuitry 320 and 330. In some embodiments, each current integrator comprises an operational amplifier that integrates the current output from a given column (or row) (or differential currents from pairs of RPU cells implementing negative and positive weights) on a capacitor.

Figure 4:
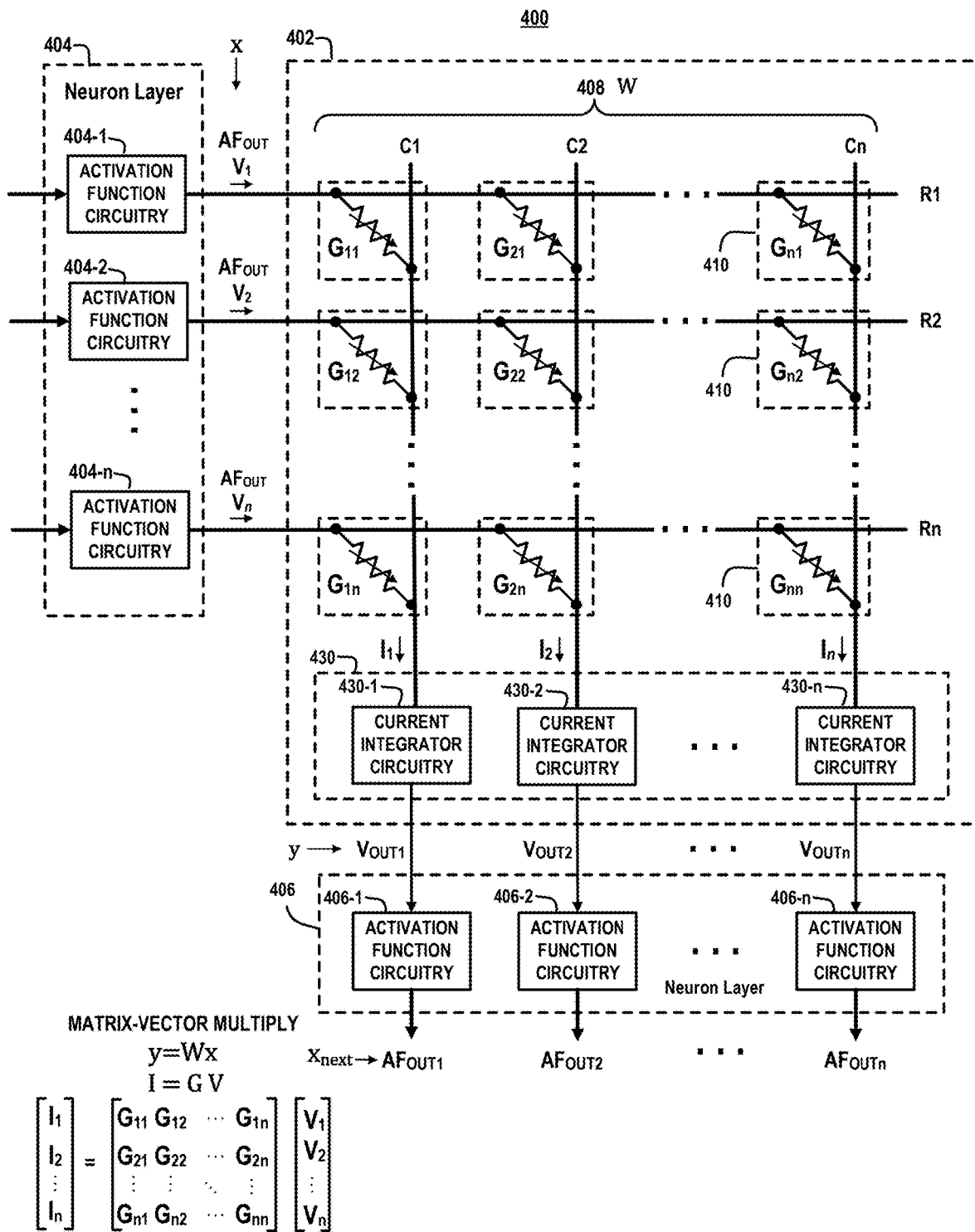
FIG. 4 schematically illustrates a method for configuring a resistive processing unit system to implement an artificial neural network comprising artificial neurons which comprise activation function circuitry, according to an exemplary embodiment of the disclosure.

The configuration of the peripheral circuitry 320 and 330 will vary depending on, e.g., the hardware configuration (e.g., digital or analog processing) of the artificial neurons. In some embodiments, the artificial neurons of the neuron layers 304 and 306 comprise analog functional units, which can be implement in whole in or part using the peripheral circuitry 320 and 330 of the RPU crossbar system 302. In some embodiments, when a given neuron layer implements neuron activation functions in the digital domain, the peripheral circuitry of the RPU crossbar system 302 is configured to convert digital activation input data into analog voltages for processing by the RPU array 308, and/or convert analog activation output data to digital activation data FIG. 4 schematically illustrates a method for configuring a resistive processing unit system to implement an artificial neural network comprising artificial neurons which comprise activation function circuitry, according to an exemplary embodiment of the disclosure. More specifically, FIG. 4 schematically illustrates a RPU system 400 which comprises an RPU crossbar system 402, a first neuron layer 404, and a second neuron layer 406. The RPU crossbar system 402 comprises an RPU array 408 (e.g., crossbar array) which comprises RPU cells 410 arranged in a plurality of rows R1, R2, ..., Rn, and a plurality of columns C1, C2, ..., Cn (e.g., number of rows and columns are the same). The RPU crossbar system 402 further comprises readout circuitry 430 which comprises blocks of current integrator circuitry 430-1, 430-2, ... 430-n, coupled to respective columns C1, C2, ..., Cn of the RPU array 408.

The first neuron layer 404 comprises blocks of activation function circuitry 404-1, 404-2, ..., 404-n, which comprise artificial neurons that perform hardware-based activation functions. The blocks of activation function circuitry 404-1, 404-2, ..., 404-n are coupled to respective rows R1, R2, ..., Rn of the RPU array 408. Similarly, the second neuron layer 406 comprises blocks of activation function circuitry 406-1, 406-2, ..., 406-n, which comprise artificial neurons that perform hardware-based activation functions. The blocks of activation function circuitry 404-1, 404-2, ..., 404-n are coupled to the outputs of the blocks of current integrator circuitry 430-1, 430-2, ... 430-n, respectively.

In some embodiments, each RPU cell 410 comprises an analog non-volatile resistive memory element (which is represented as a variable resistor having a tunable conductance G) at the intersection of each row R1, R2, ..., Rn and column C1, C2, ..., Cn of the RPU array 408. As depicted in FIG. 4, the RPU array 408 comprises a conductance matrix G comprising conductance values $G_{ij}$, where i represents a row index and j denotes a column index (for illustrative purposes, for mathematical correctness, the RPU array 408 is shown to store a transpose $G^T$ of the conductance matrix G). For purposes of illustration, it is assumed that the RPU array 408 comprises a synapse array (or connectivity matrix) of synaptic weights for fully connected layers of an artificial neural network in which n artificial neurons of the first neuron layer 404 (an input layer, or a hidden layer, etc.) are connected to each of n artificial neurons of the second neuron layer 406 (an output layer, or next downstream hidden layer, etc.). The conductance values $G_{ij}$ are mapped to synaptic weights $W_{ij}$ of a given synaptic weight matrix W stored in the RPU array 408, wherein each synaptic weight $W_{ij}$ (encoded by a given conductance value $G_{ij}$) represents a strength of a connection between two artificial neurons of different layers of the artificial neural network.

FIG. 4 illustrates an exemplary embodiment in which each block of activation function circuitry is configured to generate analog activation output data using an analog-temporal encoding scheme. For example, each block of activation function circuitry is configured to generate an activation output pulse ($AF_{OUT}$) having a fixed magnitude (e.g., ±V) but with a variable duration (e.g., pulse width) that encodes an activation output value based on an input to the block of activation function circuitry. In some embodiments, the activation output pulses ($AF_{OUT}$) have a fixed magnitude (e.g., ±VDD) but with a variable pulse duration that is a multiple of a prespecified time period (e.g., 1 nanosecond). When the pulse duration is zero (no output pulse), the activation output value can be deemed zero. When the pulse duration is non-zero, the activation output value is proportional to duration of the activation output pulses.

FIG. 4 schematically illustrates a process to compute neuron activations of the second neuron layer 406 (downstream neuron layer) based on (i) neuron activations of the first neuron layer 404 (upstream neuron layer) and (ii) the synaptic weights that connect the artificial neurons (e.g., blocks of activation function circuitry 404-1, 404-2, ..., 404-n) of the first neuron layer 404 to the artificial neurons (e.g., blocks of activation function circuitry 406-1, 406-2, ..., 406-n) of the blocks of activation function circuitry 404-1, 404-2, ..., 404-n second neuron layer 406. In particular, as shown in FIG. 4, the activation data, which is generated by the blocks of activation function circuitry 404-1, 404-2, ..., 404-n of the upstream neuron layer 404, is represented by activation outputs $AF_{OUT}$ which comprise respective analog output pulses $V_1, V_2, ..., V_n$, which represents an analog input vector $x=[V_1, V_2, ..., V_n]$.

To perform a matrix-vector multiplication, all rows R1, R2, ..., Rn are concurrently activated and the analog input voltages $V_1, V_2, ..., V_n$ (e.g., pulses), are concurrently applied to the respective rows R1, R2, ..., Rn. Each RPU cell 410 generates a corresponding read current $I_{READ}=V_i \times G_{ij}$ (based on Ohm's law), wherein $V_i$ denotes the analog input voltage applied to the given RPU cell 410 on the given row i and wherein Gij denotes the conductance value of the given RPU cell 410 at the array position i,j). As shown in FIG. 4, the read currents that are generated by the RPU cells 410 on each column C1, C2, ..., Cn are summed together (based on Kirchhoff's current law) to generate respective aggregate currents $I_1, I_2, ..., I_n$ at the output of the respective columns C1, C2, . . . , Cn. For example, the aggregate current $I_1$ for the first column C1 is determined as $I_1=(V_1G_{11}+V_2G_{12}+, \ldots, +V_nG_{1n})$.

The resulting aggregate read currents $I_1, I_2, \ldots, I_n$ at the output of the respective columns C1, C2, . . . , Cn are input to respective blocks of current integrator circuitry 430-1, 430-2, . . . , 430-n, wherein the aggregate read currents $I_1, I_2, \ldots, I_n$ are integrated over a specified integration time $T_{INT}$ to generate respective output voltages $V_{OUT1}, V_{OUT2}, \ldots, V_{OUTn}$. The output voltages $V_{OUT1}, V_{OUT2}, \ldots, V_{OUTn}$ comprise a resulting output vector $y=[V_{OUT1}, V_{OUT2}, \ldots, V_{OUTn}]$, which represents the result of the matrix-vector multiplication operation y=Wx (or I=GV). As noted above, for mathematical correctness of the equation, y=Wx, the matrix-vector multiplication operation y=Wx for the forward pass operation shown in FIG. 4 can be performed by (i) storing a transpose matrix $W^T$ of the a given weight matrix W in the RPU array 408 such that the $i^{th}$ row of the matrix W is stored in the RPU array 408 as the $j^{th}$ column of the transpose matrix $W^T$.

In this manner, each column current $I_1, I_2, \ldots, I_n$ represents a multiply-and-accumulate result for the given column, and wherein the column currents $I_1, I_2, \ldots, I_n$ (and thus the respective output voltages respective output voltages $V_{OUT1}, V_{OUT2}, \ldots, V_{OUTn}$) collectively represent the result of a matrix-vector multiplication operation y=Wx that is performed by the RPU system 400. As such, the matrix W (which is represented by the conductance matrix G of conductance values Gij) is multiplied by the input analog voltage vector $x=[V_1, V_2, \ldots, V_n]$ to generate and output an analog current vector $[I_1, I_2, \ldots, I_n]$, as illustrated in FIG. 4.

With the exemplary process shown in FIG. 4, the neuron activations $[V_1, V_2, \ldots V_n]$ of the first neuron layer 404 are linearly transformed into an analog voltage vector $y=[V_{OUT1}, V_{OUT2}, \ldots, V_{OUTn}]$ via the matrix-vector multiplication operations y=Wx performed using the RPU array 408 implemented as an artificial synaptic device array encoded with a trained weight matrix W. The analog voltages $V_{OUT1}, V_{OUT2}, \ldots, V_{OUTn}$ are input to the respective blocks of activation function circuitry 406-1, 406-2, . . . , 406-n of the second neuron layer 406, wherein the analog voltages $V_{OUT1}, V_{OUT2}, \ldots, V_{OUTn}$ are processed using the activation function circuitry 406-1, 406-2, . . . , 406-n and transformed (e.g., non-linear transforms) into the neuron activations of the second neuron layer 406, $x_{next}=[AF_{OUT1}, AF_{OUT22}, \ldots, AF_{OUTn}]$. In some embodiments, the neuron activation outputs $AF_{OUT1}, AF_{OUT22}, \ldots, AF_{OUTn}$ of the second neuron layer 406 comprise analog-temporal encoded pulses which are input to a next synaptic device array which connects the second neuron layer 406 to the next downstream layer of the artificial neutral network.

FIG. 4 illustrates an exemplary embodiment of an RPU system 400 which is configured to perform parallel vector-matrix operations, wherein the excitation vectors applied to multiple row lines to thereby perform MAC operations across an entire matrix of stored weights encoded in the conductance values of analog nonvolatile resistive memories. The RPU array 408 and readout circuitry 430 is configured to generate a summed weighted input (e.g., analog voltages $V_{OUT1}, V_{OUT2}, \ldots, V_{OUTn}$) for each neuron (e.g., each activation function circuitry 406-1, 406-2, . . . , 406-n) of the second neuron layer 406. The summed weighted inputs $V_{OUT1}, V_{OUT2}, \ldots, V_{OUTn}$ to the respective neurons are transformed via the activation function circuitry 406-1, 406-2, . . . , 406-n, respectively, into the corresponding outputs or "activations" of the neurons.

FIGS. 5A, 5B, 5C, and 5D graphically illustrate various activation functions which can be implemented in hardware according to exemplary embodiments of the disclosure. In particular, FIG. 5A graphically illustrates a ReLU activation function 500 which can be implemented in hardware using techniques as discussed in further detail below. The ReLU activation function 500 can be defined as: f(x)=max (0, x). The ReLU activation function 500 is linear for all positive values, and zero for all negative values. In other words, the ReLU activation function 500 is a 2-part piecewise linear function in which (i) f(x)=x, when x≥0, and (ii) f(x)=0, when x<0. The ReLU activation function 500 is a commonly used activation function in deep learning models for many types of neural networks. The ReLU activation function 500 is linear for values greater than zero, which provides many of the desirable properties of a linear activation function when training a neural network using, e.g., backpropagation. On the other hand, the ReLU activation function 500 is a nonlinear function because negative input values are always output as zero.

Figure 5A:
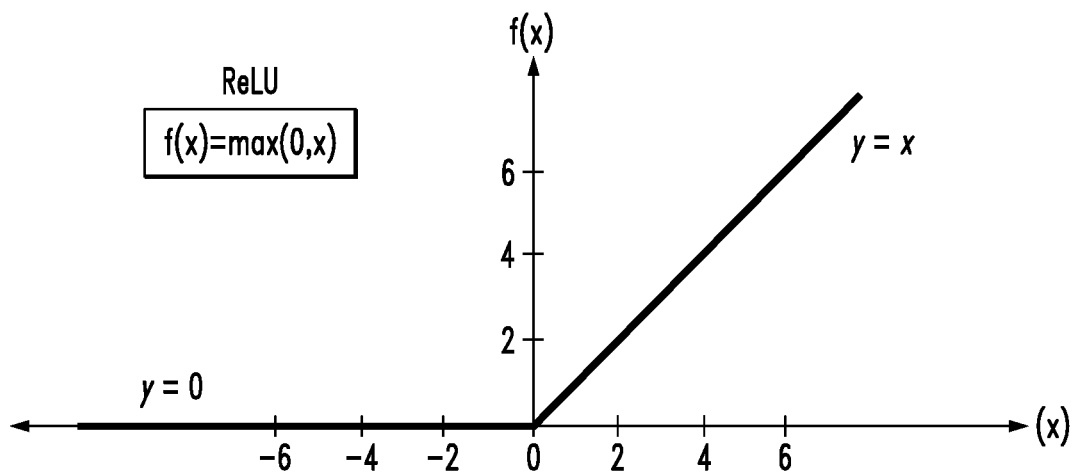
FIG. 5A graphically illustrates a rectified linear unit (ReLU) activation function which can be implemented in hardware according to an exemplary embodiment of the disclosure.
Figure 5B:
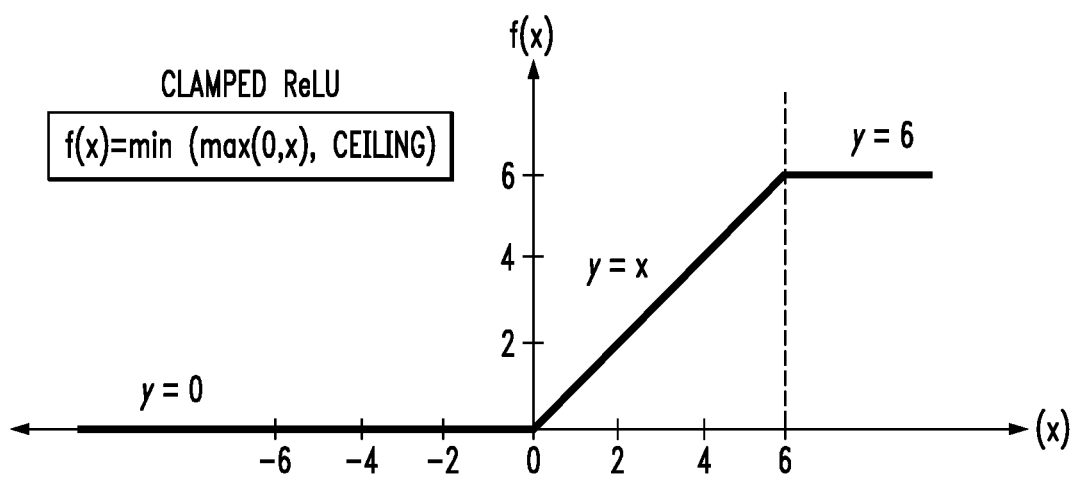
FIG. 5B graphically illustrates a clamped ReLU activation function which can be implemented in hardware according to an exemplary embodiment of the disclosure.

Next, FIG. 5B graphically illustrates a clamped ReLU activation function 510 which can be implemented in hardware using techniques as discussed in further detail below. The clamped ReLU activation function 510 is similar to the ReLU activation function 500 of FIG. 5A, except that the clamped ReLU activation function 510 performs a threshold operation in which any positive input value above a ceiling threshold value is set to the ceiling threshold value. The clamped ReLU function 510 can be defined as: f(x)=min (max(0, x), ceiling). In particular, for the clamped ReLU activation function: (i) f(x)=0, when x<0, (ii) f(x)=x, when 0≤x<ceiling, and (iii) f(x)=ceiling, when x≥ceiling. The clamped ReLU activation function 510 is configured to prevent the activation output value from becoming too large. For example, in the exemplary embodiment shown in FIG. 5B, the ceiling threshold value is set to six (6), so that any output value greater than 6 will be set to the ceiling (clamped) value of 6.

Figure 5C:
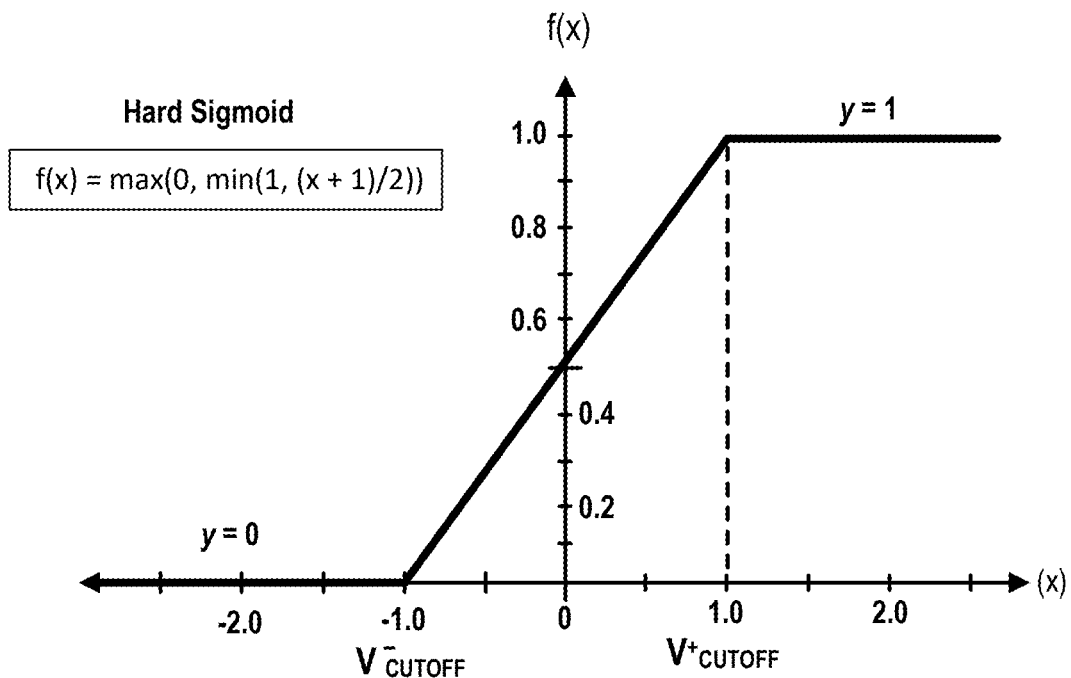
FIG. 5C graphically illustrates a hard sigmoid activation function which can be implemented in hardware according to an exemplary embodiment of the disclosure.

Next, FIG. 5C graphically illustrates a hard sigmoid activation function 520 which can be implemented in hardware using techniques as discussed in further detail below. The hard sigmoid activation function 520 is a 3-part piecewise linear approximation of the sigmoid function, which eliminates the need to compute the exponent of the sigmoid function. In some embodiments, the hard sigmoid activation function 520 can be defined as:

$$f(x) = \max\left(0, \min\left(1, \frac{(x+1)}{2}\right)\right),$$

such as shown in FIG. 5C, wherein the input (x) value to the hard sigmoid activation function 520 is transformed into a value in a range from 0.0 and 1.0. More specifically, the exemplary hard sigmoid activation function 520 comprises a positive voltage cutoff $V^+_{CUTOFF}=1.0$ and a negative voltage cutoff $V\_C_{OUTOFF}=-1.0$. When the input (x) value is larger than $V^+_{CUTOFF}=1.0$, the output will be set to a value of 1.0 (i.e., input (x) values that are larger than $V^+_{CUTOFF}$ are transformed to a value of 1.0). Similarly, when the input (x) value is less than $V^-_{CUTOFF}=-1.0$, the output value is set to a value of 0 (i.e., input (x) values that are less than $V^-_{CUTOFF}$ are transformed to a value of 0). Further, input (x) values in the range [−1.0, 1.0] linearly increase from 0 to 1.0, wherein an input value of 0 corresponds to an activation output value of 0.5.

It is to be understood that the hard sigmoid activation function can configured differently for different applications. For example, in some embodiments, a hard sigmoid activation function can be defined as f(x)=max (0, min(1, (0.2 x+0.5))). With this exemplary hard sigmoid activation function configuration, $V^+_{CUTOFF}$=2.5 and $V^-_{CUTOFF}$=−2.5, such that f(x)=0, when x<−2.5, and f(x)=1, when x>+2.5. In addition, f(x) linearly increases from 0 to 1 in the range of [−2.5, +2.5]. In other embodiments, a hard sigmoid activation function can be configured such that (i) f(x)=0, when x<$V^-_{CUTOFF}$=−3.0, (ii) f(x)=1, when x>$V^+_{CUTOFF}$=3.0, and (iii) f(x) linearly increases from 0 to 1 in the range of [−3.0, +3.0].

Figure 5D:
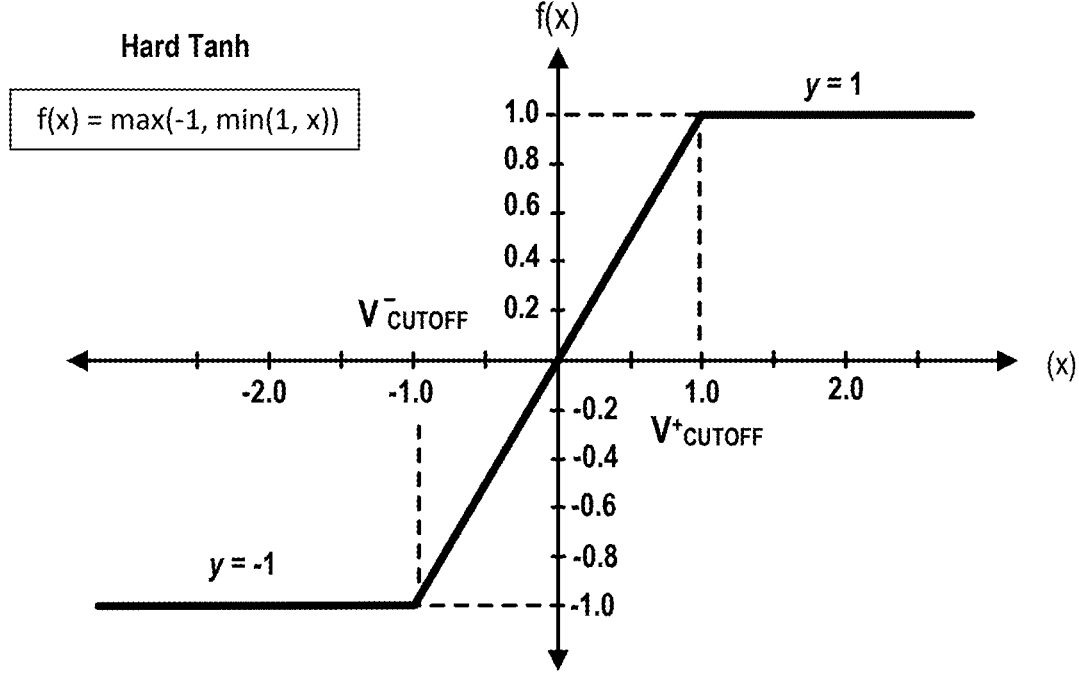
FIG. 5D graphically illustrates a hard hyperbolic tangent (tanh) activation function which can be implemented in hardware according to an exemplary embodiment of the disclosure.

Next, FIG. 5D graphically illustrates a hard tanh activation function 530 which can be implemented in hardware using techniques as discussed in further detail below. The hard tanh activation function 530 is a 3-part piecewise linear approximation of the tanh function, which eliminates the need to compute, e.g., the exponents of the tanh function. The hard tanh activation function 530 is defined as f(x)=max (−1, min(1, x)). The hard sigmoid activation function 530 comprises a positive voltage cutoff $V^+_{CUTOFF}$=1.0 and a negative voltage cutoff $V^-_{CUTOFF}$=−1.0. When the input (x) value is larger than $V^+_{CUTOFF}$=1.0, the output will be set to a value of 1.0 (i.e., input (x) values that are larger than $V^+_{CUTOFF}$=1.0 are transformed to a value of 1.0). Similarly, when the input (x) value is less than $V^-_{CUTOFF}$=−1.0, the output value is set to −1 (i.e., input (x) values that are less than $V^-_{CUTOFF}$=−1.0 are transformed to a value of −1 0). Further, input (x) values in the range [−1.0, 1.0] linearly increase from −1.0 to 1.0, wherein an input value of 0 corresponds to an output value of 0.

Figure 6:
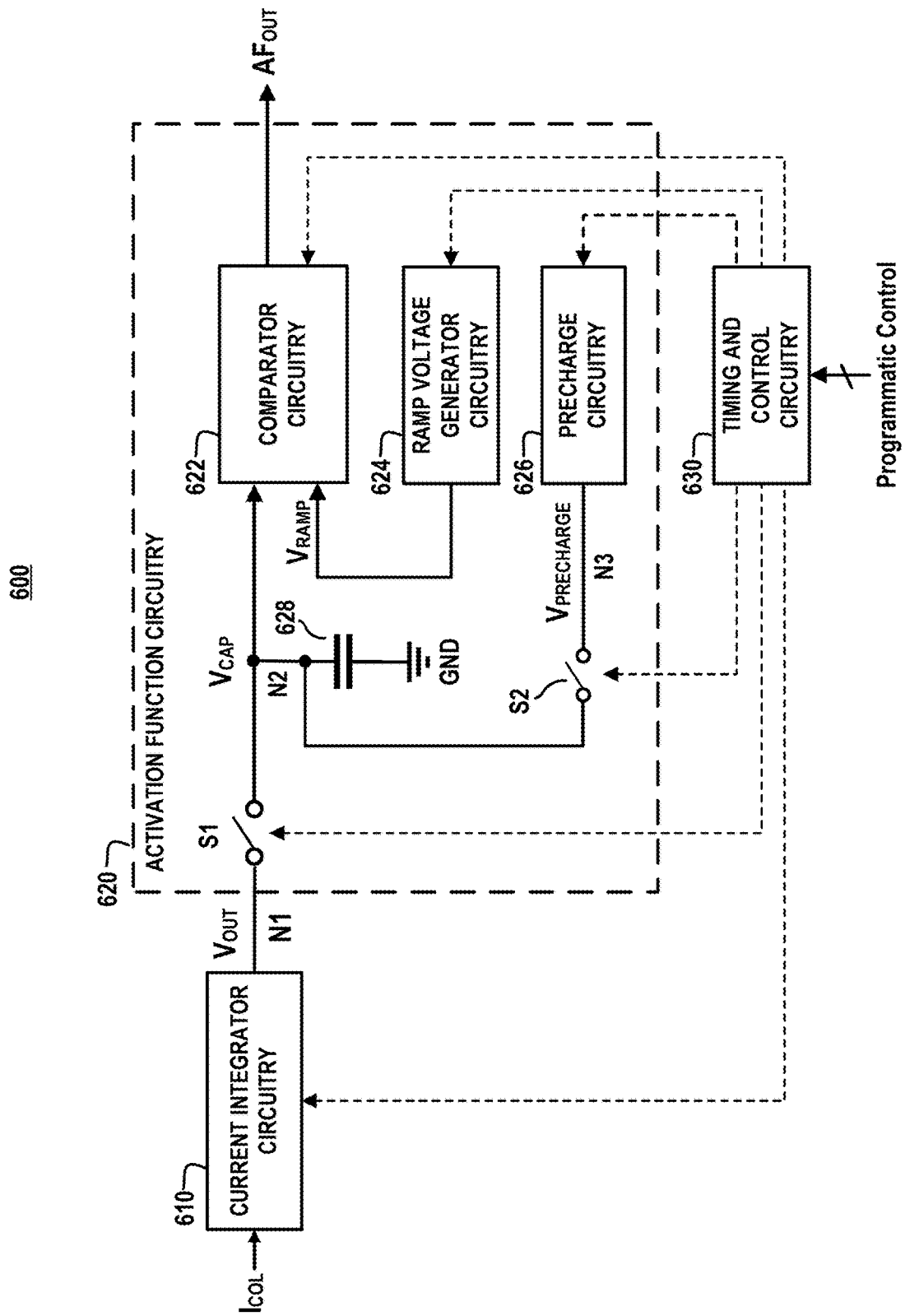
FIG. 6 schematically illustrates a hardware system which is configurable to implement a hardware activation function, according to an exemplary embodiment of the invention.

FIG. 6 schematically illustrates a hardware system 600 which is configurable to implement a hardware activation function, according to an exemplary embodiment of the invention. The hardware system 600 comprises current integrator circuitry 610, activation function circuitry 620, and timing and control circuitry 630. The activation function circuitry 620 comprises a first switch S1, a second switch S2, comparator circuitry 622, ramp voltage generator circuitry 624, precharge circuitry 626, and a capacitor 628. The timing and control circuitry 630 is configured to control the functions and operations of the switches S1 and S2, the comparator circuitry 622, the ramp voltage generator circuitry 624, and the precharge circuitry 626 using control signals that are applied on respective control lines which are illustrated in FIG. 6 as dashed lines. In some embodiments, the timing and control circuitry 630 comprises local control circuitry that is implemented for a given RPU tile (e.g., control signal circuitry 340, FIG. 3) to control functions and operations of the RPU tile.

For ease of illustration, FIG. 6 illustrates a hardware implementation of a given node (e.g., artificial neuron) of an artificial neural network in which (i) the current integrator circuitry 610 is configured to receive a current $I_{COL}$ (which is output from a given column of an RPU array) and generate an output voltage $V_{OUT}$ which represents the multiply-accumulate (MAC) result that is output from the given column, and (ii) the activation function circuitry 620 is configured to implement a non-linear activation function which transforms the MAC result (summed weighted input) into the specific output or "activation" ($AF_{OUT}$) for the given node. In some embodiments, the activation function circuitry 620 is configurable to implement one of a plurality of different types of non-linear activation functions such as, e.g., a ReLU activation function, a clamped ReLU activation function, a hard sigmoid activation function, a hard tanh activation function, etc. For example, as explained in further detail below, the timing and control circuitry 630 is configured to control the functions and operations of the comparator circuitry 622, the ramp voltage generator circuitry 624, and precharge circuitry 626, to configure the activation function circuitry 620 to implement a desired non-linear activation function and to tune the operation of the activation function circuitry 620 to increase the accuracy of the hardware-implemented non-linear activation function computations.

The current integrator circuitry 610 can be implemented using any type of current integrator circuitry which is suitable for the given application to perform an integration function over an integration period ($T_{INT}$) to convert the current $I_{COL}$ at the input node of the current integrator circuitry 610 to an analog voltage $V_{OUT}$ at an output node (N1) of the current integrator circuitry 610. For example, in some embodiments, the current integrator circuitry 610 comprises an operational transconductance amplifier (OTA) with capacitive feedback provided by one or more integrating capacitors to convert the input current $I_{COL}$ (aggregate column current) to the output voltage $V_{OUT}$ on the output node N1.

In some embodiments, as explained in further detail below, the activation function circuitry 620 is configurable to implement one of a plurality of different types of non-linear activation functions such as, e.g., a ReLU activation function, a clamped ReLU activation function, a hard sigmoid activation function, a hard tanh activation function, etc. As shown in FIG. 6, the capacitor 628 is coupled between an input node N2 of the activation function circuitry 620, and a negative power supply node (e.g., ground (GND) node). The first switch S1 is coupled between the output node N2 of the current integrator circuitry 610 and the input node N2 of the activation function circuitry 620. The first switch S1 is selectivity activated/deactivated under the control of the timing and control circuitry 630.

The comparator circuitry 622 comprises a first input terminal (e.g., non-inverting input terminal) that is coupled to the input node N2, and a second input terminal (e.g., inverting input terminal) that is coupled to an output of the ramp voltage generator circuitry 624. In some embodiments, as explained in further detail below, the ramp voltage generator circuitry 624 is configured to generate a linear ramp voltage VRAMP which is input to the comparator circuitry 622 during a "conversion" period (denoted $T_{CONVERSION}$) in which the analog output voltage $V_{OUT}$ (which represents the MAC result (or summed weighted input) that is input to the given neuron) is converted to a voltage pulse at the output of the comparator circuitry 622. As explained in further detail below, a duration of the voltage pulse, which is output from the comparator circuitry 622 during the conversion period, encodes the output value $AF_{OUT}$ of the non-linear activation function implemented by the activation function circuitry 620.

As further shown in FIG. 6, the second switch S2 is coupled between the input node N2 and an output node N3 of the precharge circuitry 626. The second switch S2 is selectively activated/deactivated under the control of the timing and control circuitry 630. The precharge circuitry 626 is configured to generate a precharge voltage $V_{PRECHARGE}$ to precharge the capacitor 628 before the start of a given conversion period. During a precharge period, the second switch S2 is activated (e.g., closed) to couple the output of the precharge circuitry 626 to the input node N2 to charge the capacitor voltage VCAP of the capacitor 628 to the precharge voltage level $V_{PRECHARGE}$. In some embodiments, the precharge voltage level $V_{PRECHARGE}$ represents a zero-level input to the non-linear activation function implemented by the activation function circuitry 620.

During an integration period $T_{INT}$, the summed current $I_{COL}$ on a given column of the RPU array is converted by the current integrator circuitry 610 to an analog output voltage $V_{OUT}$. During the integration period, the first switch S1 is maintained in a deactivated state (e.g., open) so that the output voltage $V_{OUT}$ can be generated on the output node N1 of the current integrator circuitry 610. Further, during the integration period $T_{INT}$ or prior to the start of the conversion period $T_{CONVERSION}$, the second switch S2 is selectively activated for a period of time to apply the precharge voltage $V_{PRECHARGE}$ (which is output from the precharge circuitry 626) to the capacitor 628 to precharge the capacitor voltage VCAP to the precharge voltage level. At the end of the integration period, the first switch S1 is activated for a given period of time sufficient to latch in the output voltage $V_{OUT}$ to the input node N2 by charging the capacitor 628 to $V_{OUT}$. The precharging of the capacitor 628 enables the voltage on the capacitor 628 to increase or decrease to the level of $V_{OUT}$ (from the precharged voltage level) in a relatively short amount of time before the start of the conversion period.

In some embodiments, the timing (e.g., duration, start time, end time) of the conversion period is controlled by the timing and control circuitry 630. For example, the timing and control circuitry 630 generates a control signal to enable the operation of the comparator circuitry 622 at the start of a given conversion period, and generates a control signal to disable the operation of the comparator circuitry 622 at the end of the given conversion period. During a conversion period, the comparator circuitry 622 continuously compares the capacitor voltage VCAP of the capacitor 628 (which is charged to the output voltage $V_{OUT}$) to the linear ramp voltage VRAMP that is output from the ramp voltage generator circuit 624, and generates an output signal $AF_{OUT}$ based on the result of the continuous comparison during the conversion period. In some embodiments, as noted above, the output signal $AF_{OUT}$ comprises a voltage pulse with a duration that encodes the activation function output value.

In some embodiments, the ramp voltage generator circuitry 624 and the precharge circuitry 626 comprise configurable hardware frameworks in which various operating parameters of the ramp voltage generator circuitry 624 and the precharge circuitry 626 can be independently adjusted by control signals applied from the timing and control circuitry 630 to configure the activation function circuitry 620 to implement a desired non-linear activation function and to tune the operation of the activation function circuitry 620 to increase the accuracy of the hardware-implemented non-linear activation function. For example, in some embodiments, the timing (e.g., duration, start time, end time) of the linear ramp voltage signal VRAMP is adjustable under control of the timing and control circuitry 630 to achieve target functionalities. Further, in some embodiments, the minimum voltage level and maximum voltage level of the linear ramp voltage signal VRAMP is adjustable under control of the timing and control circuitry 630 to achieve target functionalities. Moreover, in some embodiments, the magnitude of the precharge voltage $V_{PRECHARGE}$ is adjustable under control of the timing and control circuitry 630 to achieve target functionalities.

The timing and control circuitry 630 can be implemented using various control circuit architectures and techniques to implement the exemplary control functions as discussed herein. For example, to implement timing control functions, the timing and control circuitry 630 may comprise (i) a clock pulse generator circuit which is configured to generate pulses at a given frequency, and (ii) one or more counters that are configured to count a number of pulses that are output from the clock pulse generator, wherein a given time period is correlated to a specific count of received clock pulses (e.g., a specified number of clock pulses accumulated in a given counter is proportional to given time period), as is understood by those of ordinary skill in the art.

For example, the integration time $T_{INT}$ of the current integrator circuitry 610 can be controlled by inputting clock pulses to an integration time counter to perform a first counting process which correlates to the integration time $T_{INT}$. Further, the conversion time $T_{CONVERSION}$ of the activation function circuitry 620 can be controlled by inputting clock pulses to a conversion time counter to perform a second counting process which correlates to the conversion time. In addition, the duration of the ramp voltage signal can be controlled by inputting clock pulses to a ramp voltage generation time counter to perform a third counting process which correlates to the duration of the linear ramp voltage that is output from the ramp voltage generator circuitry 624.

Further, in some embodiments, the timing and control circuitry 630 comprises control logic to generate a first start signal to start a current integration process, wherein the first start signal is configured to reset the current integrator circuitry 610, as well as reset the integration time counter to zero and begin the counting process to control the current integration period. When the integration time counter reaches a specified count value (indicating the end of the integration period), the control logic can be configured to generate a control signal to terminate the integration operation of the current integrator circuitry 610.

Further, in some embodiments, the timing and control circuitry 630 comprises control logic to generate a second start signal to start a conversion process, wherein the second start signal is configured to enable operation of the comparator circuitry 622, as well as reset the conversion time counter to zero and begin the counting process to control the conversion period. When the conversion time counter reaches a specified count value (indicating the end of the conversion period), the control logic generates a control signal to disable operation of the comparator circuitry 622. Moreover, in some embodiments, the timing and control circuitry 630 comprises control logic to generate a third start signal to initiate the ramp voltage generator process, wherein the third start signal is configured to cause the ramp voltage generator circuitry 624 to output a linear ramp voltage signal VRAMP, as well as reset the ramp voltage generation time counter circuit to zero and begin the counting process to control the duration of the linear ramp voltage signal VRAMP that is output from the ramp voltage generator circuitry 624. When the ramp voltage generation time reaches a specified count value (indicating that the specified output duration of the linear ramp voltage has been reached), the control logic generates a control signal to disable the output of the ramp voltage generator circuitry 624.

In addition, the timing and control circuitry 630 comprises control logic to control the timing of the activation and deactivation of the switches S1 and S2 in coordination with the current integration, conversion, and capacitor precharge operations. In some embodiments, the timing and control circuitry 630 is programmatically controlled to apply control logic settings that are configured to adjust the timings of the current integration, conversion, and capacitor precharge operations, and to specify voltage levels for voltage signals generated by the ramp voltage generator circuitry 624 and precharge circuitry 626.

Figure 7:
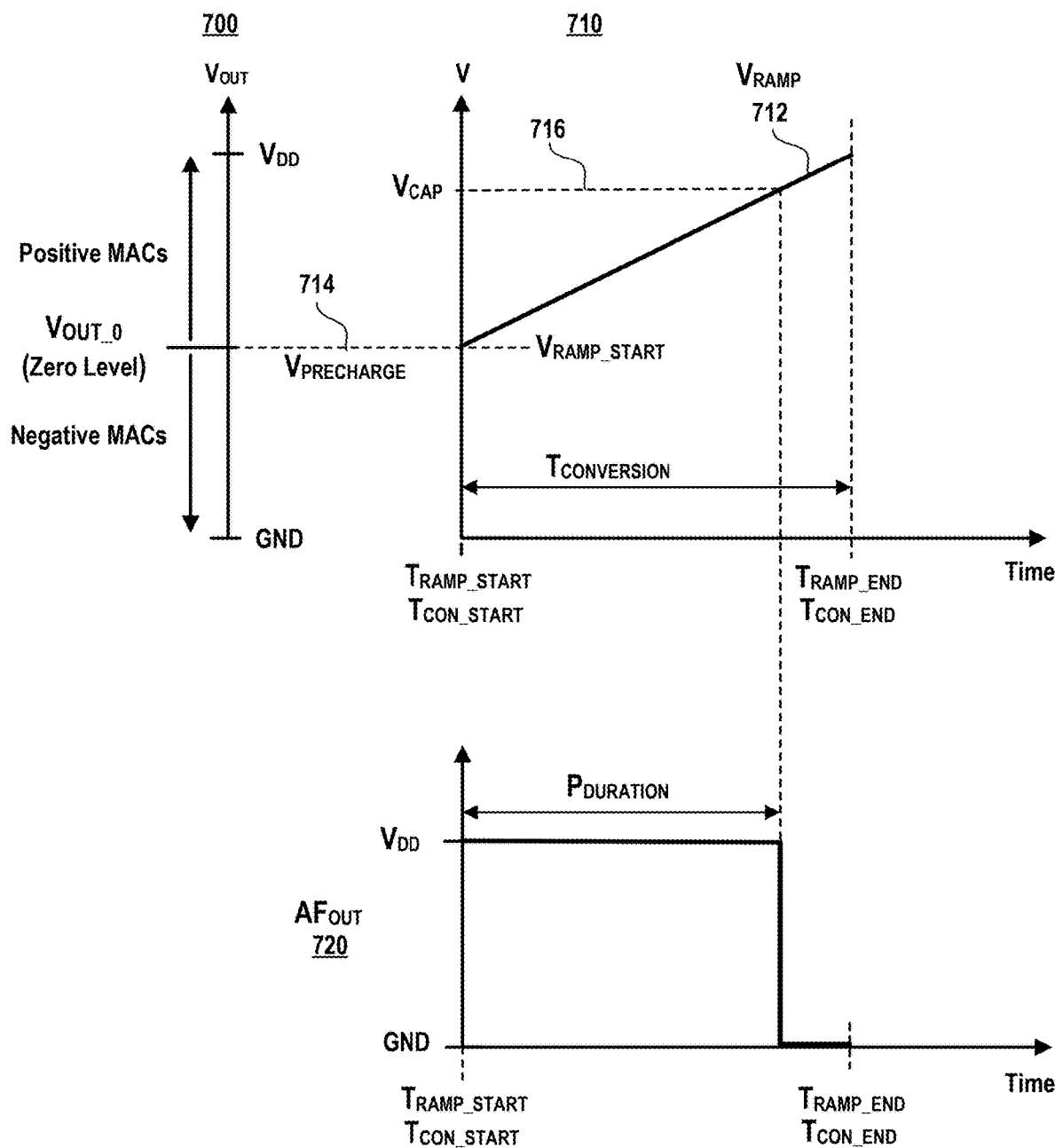
FIG. 7 schematically illustrates an exemplary configuration of the hardware system of FIG. 6 to implement a ReLU activation function, according to an exemplary embodiment of the disclosure.

As noted above, the activation function circuitry 620 is configurable to implement one of a plurality of different types of non-linear activation functions such as, e.g., a ReLU activation function, a clamped ReLU activation function, a hard sigmoid activation function, a hard tanh activation function, etc. For example, FIG. 7 schematically illustrates operation of the activation function circuitry 620 configured to implement a ReLU activation function, according to an exemplary embodiment of the disclosure. In particular, FIG. 7 schematically illustrates a mapping 700 of output voltages $V_{OUT}$ to a range of positive MAC values, a range of negative MAC values, and a zero MAC value. In some embodiments, the output voltages $V_{OUT}$ (which are output from the current integrator circuitry 610) fall within the range of GND (e.g., 0V) and VDD. The zero level MAC value is mapped to a specified $V_{OUT}$ level (denoted $V_{OUT\_0}$) between GND and $V_{DD}$, wherein the range of $V_{OUT}$ voltage levels greater than $V_{OUT\_0}$ and up to $V_{DD}$ are mapped to a range of positive MAC values, and wherein the range of $V_{OUT}$ voltage levels less than $V_{OUT\_0}$ and down to GND are mapped to a range of negative MAC values.

Further, FIG. 7 depicts a timing diagram 710 which schematically illustrates a ReLU activation function that is performed by the activation function circuitry 620, according to an exemplary embodiment of the disclosure. In particular, the timing diagram 710 illustrates an exemplary linear ramp voltage VRAMP 712 that is output from the ramp voltage generator circuitry 624 over a given period from a ramp voltage start time (denoted $T_{RAMP\_START}$) to a ramp voltage end time (denoted $T_{RAMP\_END}$). In addition, the timing diagram 710 illustrates an exemplary conversion period (denoted $T_{CONVERSION}$) from a conversion start time (denoted $T_{CON\_START}$) to a conversion end time (denoted $T_{CON\_END}$).

As further shown in FIG. 7, the linear ramp voltage VRAMP 712 has an initial voltage level (denoted $V_{RAMP\_START}$) which is the same as a precharge voltage level 714 (denoted $V_{PRECHARGE}$) to which the capacitor 628 is precharged prior to the start of the conversion period. In some embodiments, as shown in FIG. 7, the precharge voltage level 714 corresponds to the zero level MAC value ($V_{OUT\_0}$). In this regard, prior to the conversion period, the capacitor voltage VCAP is precharged to $V_{OUT\_0}$.

To perform the ReLU computation operation, prior to the start of the conversion period, the output voltage $V_{OUT}$ generated by the current integrator circuitry 610 is applied to the input node N2 of the activation function circuitry 620, which causes the capacitor voltage VCAP to either increase or decrease to $V_{OUT}$. For illustrative purposes, the timing diagram 710 illustrates a state in which the output voltage $V_{OUT}$ is greater than the precharge voltage level 714 (zero level MAC value $V_{OUT\_0}$), such that a capacitor voltage VCAP 716 increases to a level that is greater than the precharge voltage level 714.

During the conversion period $T_{CONVERSION}$, the comparator circuitry 622 continuously compares the capacitor voltage VCAP 716 to the linear ramp voltage $V_{RAMP}$ 712, and generates an activation output signal $AF_{OUT}$ 720 based on the result of the continuous comparison during the conversion period. In particular, FIG. 7 illustrates an exemplary activation output signal $AF_{OUT}$ 720 that is generated under the exemplary voltage levels and timing conditions of the timing diagram 710. In particular, as shown in FIG. 7, as the linear ramp voltage $V_{RAMP}$ 712 increases from the initial ramp voltage level $V_{RAMP\_START}$, the comparator circuitry 622 is configured to output a logic 1 level (e.g., $V_{DD}$) during a period of time in which the linear ramp voltage $V_{RAMP}$ 712 is less than capacitor voltage VCAP 716. As further shown in FIG. 7, when the linear ramp voltage $V_{RAMP}$ 712 reaches the capacitor voltage VCAP 716, the comparator circuitry 622 is configured to switch the output to a logic 0 level (e.g., GND), and remain at the logic 0 level (e.g., GND) during the remainder of the conversion period $T_{CONVERSION}$ in which the linear ramp voltage $V_{RAMP}$ 712 exceeds the capacitor voltage VCAP 716.

In this configuration, the activation output signal $AF_{OUT}$ 720 comprises a voltage pulse with a pulse duration PDURATION that encodes the activation function output value based on the input value $V_{OUT}$. In instances where $V_{OUT} \geq V_{PRECHARGE}$ (indicating a zero or positive MAC input value), the activation output signal $AF_{OUT}$ will comprise a voltage pulse with a pulse duration $P_{DURATION}$ that encodes and corresponds to the zero or positive MAC value that is input to the ReLU activation function. The larger $V_{OUT}$ is relative to $V_{PRECHARGE}$, the longer the pulse duration $P_{DURATION}$ of the activation output signal $AF_{OUT}$. Ideally, when $V_{OUT}=V_{PRECHARGE}=V_{RAMP\_START}$, the activation output signal $AF_{OUT}$ will have a pulse duration $P_{DURATION}$ of zero (0) as the output of the comparator circuitry 622 will remain at logic level 0 (e.g., GND).

On the other hand, in instances where $V_{OUT}<V_{PRECHARGE}=V_{RAMP\_START}$ (indicating a negative MAC input value), the output of the comparator circuitry 622 will remain at logic level 0, since the capacitor voltage VCAP will be less than the linear ramp voltage $V_{RAMP}$ 712 during the entire conversion period $T_{CONVERSION}$. For example, when $V_{OUT}<V_{PRECHARGE}=V_{RAMP\_START}$, the capacitor voltage VCAP will decrease from the precharge level $V_{PRECHARGE}$ to the current integrator output level $V_{OUT}$ such that $V_{CAP}$ will be less than $V_{RAMP\_START}$ at the start $T_{CON\_START}$ of the conversion period $T_{CONVERSION}$.

In this regard, FIG. 7 illustrates an exemplary ReLU configuration of the activation function circuitry 620 in which (i) $V_{PRECHARGE}=V_{RAMP\_START}$, (ii) the start time $T_{CON\_START}$ of the conversion period $T_{CONVERSION}$ coincides with the start time $T_{RAMP\_START}$ of the linear ramp voltage $V_{RAMP}$, and (iii) the start voltage level $V_{RAMP\_START}$ of the linear ramp voltage $V_{RAMP}$ 712 coincides with the zero-level output $V_{OUT\_0}$. As such, the configuration of the activation function circuitry 620 as shown in FIG. 7 implements the exemplary ReLU function as shown in FIG. 5A where f(x)=x, when x≥0, and (ii) f(x)=0, when x<0.

In some embodiments, the duration of the ramp voltage ($V_{RAMP\_START}$ to $V_{RAMP}$_END) corresponds to, or otherwise coincides with the integration period $T_{INT}$ for the next layer of the artificial neural network. In particular, as the activation output signal $AF_{OUT}$ 720 is generated and output from activation function circuitry of the neuron of a given neuron layer, the activation output signal $AF_{OUT}$ 720 is input to the next synaptic device array and processed during the integration period $T_{INT}$ to generate the activation data to the next downstream neuron layer.

Figure 8:
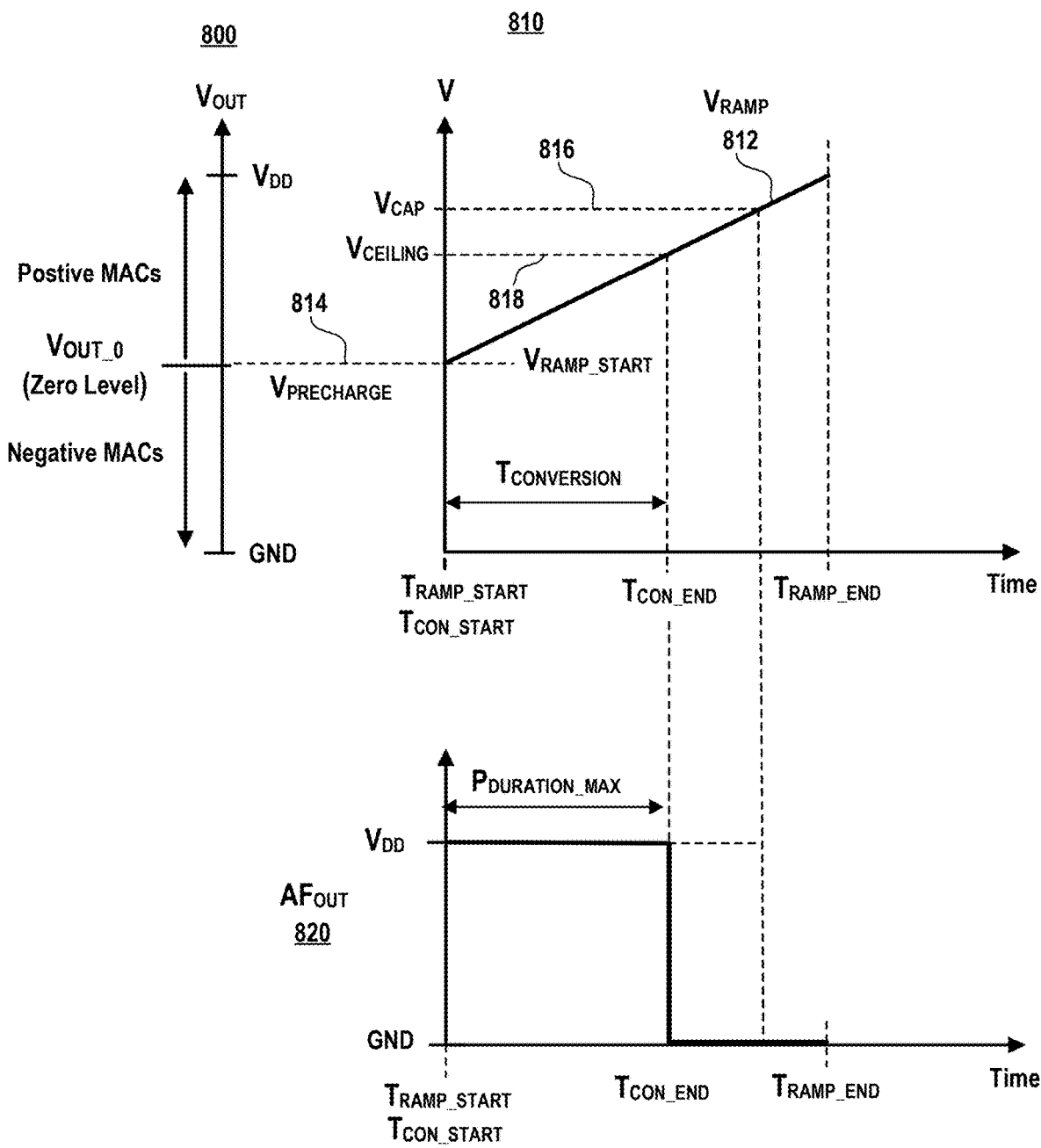
FIG. 8 schematically illustrates an exemplary configuration of the hardware system of FIG. 6 to implement a clamped ReLU activation function, according to an exemplary embodiment of the disclosure.

Next, FIG. 8 schematically illustrates operation of the activation function circuitry 620 configured to implement a clamped ReLU activation function, according to an exemplary embodiment of the disclosure. In particular, the timing and voltage configurations for the clamped ReLU activation function as shown in FIG. 8 are similar to the timing and voltage configurations for the ReLU activation function as shown in FIG. 7, except that the clamped ReLU activation function is implemented by changing the end time $T_{CON\_END}$ of the conversion period $T_{CONVERSION}$ to limit the duration of the conversion period and thereby limit a maximum pulse duration of an activation output signal $AF_{OUT}$. In particular, FIG. 8 schematically illustrates a mapping 800 of output voltages $V_{OUT}$ to a range of positive MAC values, a range of negative MAC values, and a zero MAC value, which is the same or similar to the mapping 700 discussed above in conjunction with FIG. 7.

Further, FIG. 8 depicts a timing diagram 810 which schematically illustrates a clamped ReLU activation function that is performed by the activation function circuitry 620, according to an exemplary embodiment of the disclosure. In particular, the timing diagram 810 illustrates an exemplary linear ramp voltage $V_{RAMP}$ 812 that is output from the ramp voltage generator circuitry 624 over a given period from a ramp voltage start time $T_{RAMP\_START}$ to a ramp voltage end time $T_{RAMP\_END}$. In addition, the timing diagram 810 illustrates an exemplary conversion period $T_{CONVERSION}$ from a conversion start time $T_{CON\_START}$ to a conversion end time $T_{CON\_END}$.

The clamped ReLU configuration shown in the timing diagram 810 of FIG. 8 is similar to the ReLU configuration shown in the timing diagram of 710 FIG. 7 in that (i) $V_{PRECHARGE} = V_{RAMP\_START}$, (ii) the start time $T_{CON\_START}$ of the conversion period $T_{CONVERSION}$ coincides with the start time $T_{RAMP\_START}$ of the linear ramp voltage $V_{RAMP}$ 812 and (iii) the start voltage level $V_{RAMP\_START}$ of the linear ramp voltage $V_{RAMP}$ 812 coincides with the zero-level output $V_{OUT\_0}$. However, in contrast to FIG. 7, the clamped ReLU configuration shown in the timing diagram 810 of FIG. 8 is implemented by changing the end time $T_{CON\_END}$ of the conversion period $T_{CONVERSION}$ to be less than the end time $T_{RAMP\_END}$ of the linear ramp voltage $V_{RAMP}$ 812, which results in limiting/shortening the conversion period $T_{CONVERSION}$. The end time $T_{CON\_END}$ of the conversion period $T_{CONVERSION}$ coincides with a maximum voltage level $V_{CEILING}$ 818.

For illustrative purposes, the timing diagram 810 illustrates a state in which the output voltage $V_{OUT}$ is greater than the precharge voltage level 814 (zero level MAC value $V_{OUT\_0}$), such that a capacitor voltage VCAP 816 increases to a level that is greater than precharge voltage level 814. In addition, the timing diagram 810 illustrates a state in which the capacitor voltage VCAP 816 is greater than the maximum voltage level $V_{CEILING}$ 818.

FIG. 8 illustrates an exemplary activation output signal $AF_{OUT}$ 820 that is generated under the exemplary voltage levels and timing conditions of the timing diagram 810. In particular, as shown in FIG. 8, as the linear ramp voltage $V_{RAMP}$ 812 increases from the initial ramp voltage level $V_{RAMP\_START}$, the comparator circuitry 622 is configured to output a logic 1 level (e.g., $V_{DD}$) as long as the linear ramp voltage $V_{RAMP}$ 812 is less than capacitor voltage VCAP 816. However, as further shown in FIG. 8, at the end time $T_{CON\_END}$ of the conversion period $T_{CONVERSION}$, the comparator circuitry 622 output is disabled, which results in the output of the comparator circuitry 622 switching to a logic level 0 output, even though the voltage level of the linear ramp voltage $V_{RAMP}$ 812 is less than the voltage level of capacitor voltage VCAP 816 at the end time $T_{CON\_END}$ of the conversion period $T_{CONVERSION}$.

In this exemplary configuration, the activation output signal $AF_{OUT}$ 820 shown in FIG. 8 comprises a voltage pulse with a maximum pulse duration $P_{DURATION\_MAX}$ which encodes the clamped ReLU output value that corresponds to the maximum voltage level $V_{CEILING}$. In all instances where $V_{OUT} \geq V_{CEILING}$, the activation output signal $AF_{OUT}$ 820 output from the comparator circuitry 622 will have the maximum pulse duration $P_{DURATION\_MAX}$. Further, in instances where $V_{PRECHARGE} = V_{RAMP\_START} \leq V_{OUT} < V_{CEILING}$ (indicating a zero or positive MAC input value), the activation output signal $AF_{OUT}$ will comprise a voltage pulse with a pulse duration $P_{DURATION}$ that encodes and corresponds to the zero or positive MAC value that is input to the clamped ReLU activation function. Finally, when $V_{OUT} < V_{PRECHARGE} = V_{RAMP\_START}$ (indicating a negative MAC input value), the activation output signal $AF_{OUT}$ will have a pulse duration $P_{DURATION}$ of zero since the output of the comparator circuitry 622 will remain at logic level 0 (e.g., GND). As such, the configuration of the activation function circuitry 620 as shown in FIG. 8 implements the exemplary clamped ReLU function as shown in FIG. 5B in which (i) f(x)=0, when x<0, (ii) f(x)=x, when 0≤x<ceiling, and (iii) f(x)=ceiling, when x≥ceiling.

Figure 9:
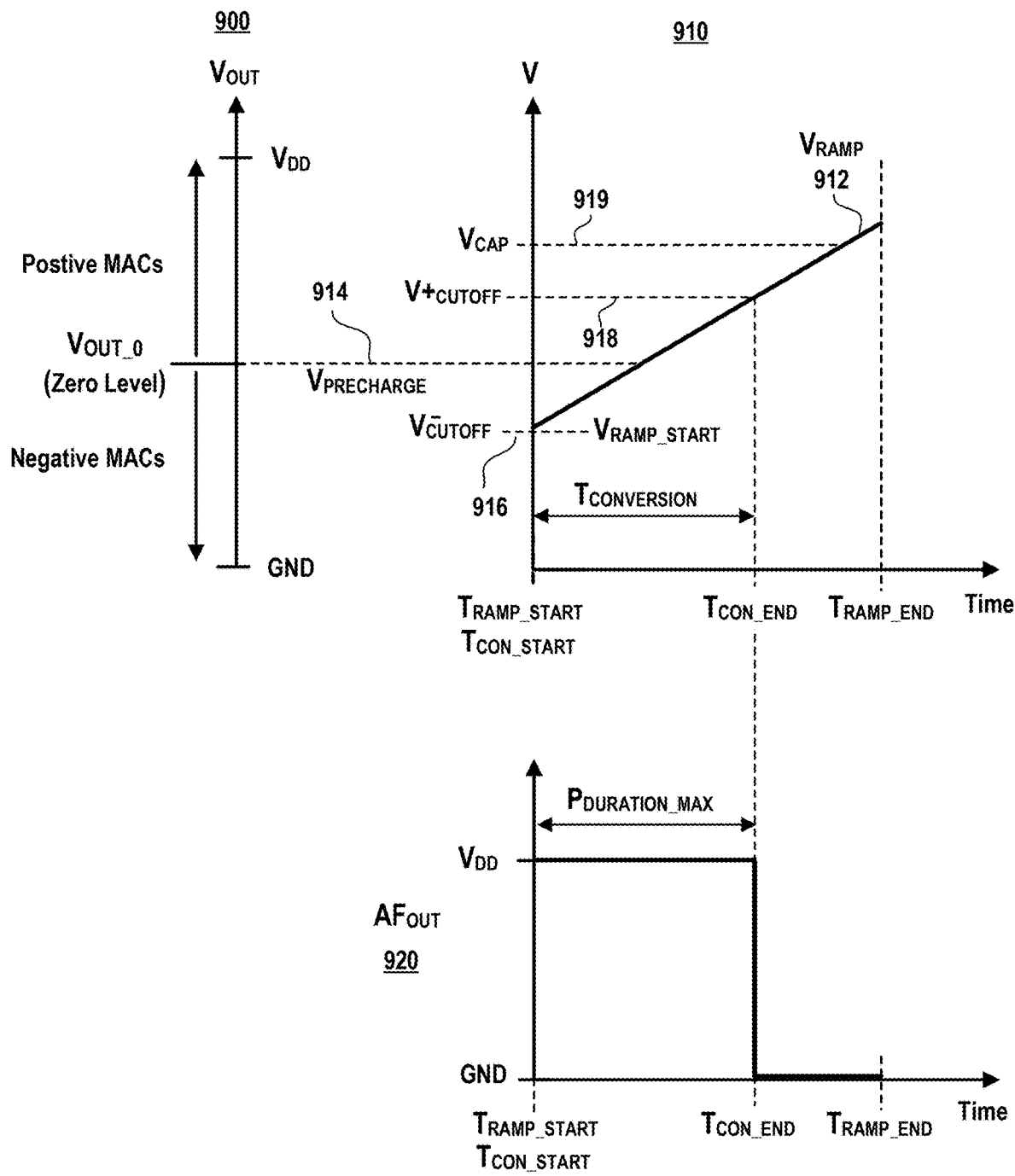
FIG. 9 schematically illustrates an exemplary configuration of the hardware system of FIG. 6 to implement a hard sigmoid activation function, according to an exemplary embodiment of the disclosure.

Next, FIG. 9 schematically illustrates operation of the activation function circuitry 620 configured to implement a hard sigmoid activation function, according to an exemplary embodiment of the disclosure. In particular, the timing and voltage configurations for the hard sigmoid activation function as shown in FIG. 9 are similar to the timing and voltage configurations for the clamped ReLU activation function as shown in FIG. 8, except that the hard sigmoid activation function is implemented by setting a start voltage level $V_{RAMP\_START}$ of a linear ramp voltage $V_{RAMP}$ to be less than a zero level precharge voltage. In particular, FIG. 9 schematically illustrates a mapping 900 of output voltages $V_{OUT}$ to a range of positive MAC values, a range of negative MAC values, and a zero MAC value, which is the same or similar to the mapping 700 discussed above in conjunction with FIG. 7. Further, FIG. 9 depicts a timing diagram 910 which schematically illustrates a hard sigmoid activation function that is performed by the activation function circuitry 620, according to an exemplary embodiment of the disclosure.

In particular, the timing diagram 910 illustrates an exemplary linear ramp voltage $V_{RAMP}$ 912 that is output from the ramp voltage generator circuitry 624 over a given period from a ramp voltage start time $T_{RAMP\_START}$ to a ramp voltage end time $T_{RAMP\_END}$. In addition, the timing diagram 910 illustrates an exemplary conversion period $T_{CONVERSION}$ from a conversion start time $T_{CON\_START}$ to a conversion end time $T_{CON\_END}$. The hard sigmoid implementation shown in the timing diagram 910 of FIG. 9 is configured by (i) setting a precharge voltage $V_{PRECHARGE}$ 914 to be equal to the zero-level MAC input ($V_{OUT\_0}$), (ii) setting a start voltage level $V_{RAMP\_START}$ 916 of the linear ramp voltage $V_{RAMP}$ 912 to be equal to a negative voltage cutoff value ($V^{-}_{CUTOFF}$) of the given hard sigmoid activation function, which is less than the zero-level precharge voltage $V_{PRECHARGE}$ 914, and (iii) setting the end time $T_{CON\_END}$ of the conversion period $T_{CONVERSION}$ to coincide with a voltage level of the linear ramp voltage 912 which corresponds to a positive voltage cutoff value ($V^{+}_{CUTOFF}$) of the given hard sigmoid activation function, which is greater than the zero-level precharge voltage $V_{PRECHARGE}$ 914.

For illustrative purposes, the timing diagram 910 illustrates a state in which the output voltage $V_{OUT}$ (which is input to the activation function circuitry) is greater than the precharge voltage $V_{PRECHARGE}$ 914 (zero level MAC value $V_{OUT\_0}$), such that a capacitor voltage VCAP 919 increases to a level that is greater than both the precharge voltage $V_{PRECHARGE}$ 914 and the positive voltage cutoff value ($V^{+}_{CUTOFF}$). FIG. 9 illustrates an exemplary activation output signal $AF_{OUT}$ 920 that is generated under the exemplary voltage levels and timing conditions of the timing diagram 910, wherein the capacitor voltage VCAP (which is charged to $V_{OUT}$) is larger than the positive voltage cutoff value ($V^+_{CUTOFF}$).

In particular, as shown in FIG. 9, as the linear ramp voltage $V_{RAMP}$ 912 increases from the initial ramp voltage level $V_{RAMP\_START}$, the comparator circuitry 622 is configured to output a logic 1 level (e.g., $V_{DD}$) as long as the linear ramp voltage $V_{RAMP}$ 912 is less than the capacitor voltage VCAP 919. However, as further shown in FIG. 9, at the end time $T_{CON\_END}$ of the conversion period $T_{CONVERSION}$, the comparator circuitry 622 output is disabled, which results in the output of the comparator circuitry 622 switching to a logic level 0 output, even though the voltage level of the linear ramp voltage $V_{RAMP}$ 912 is less than the capacitor voltage VCAP 919 at the end time $T_{CON\_END}$ of the conversion period $T_{CONVERSION}$.

In this exemplary configuration, the activation output signal $AF_{OUT}$ 920 shown in FIG. 9 comprises a voltage pulse with a maximum pulse duration $P_{DURATION\_MAX}$ which encodes the maximum output value of 1.0 which corresponds to the positive voltage cutoff $V^+_{CUTOFF}$ 918 (e.g., value of 1.0). In all instances where VCAP= $V_{OUT} \geq V^+_{CUTOFF}$, the activation output signal $AF_{OUT}$ 920 generated at the output of the comparator circuitry 622 will have the maximum pulse duration $P_{DURATION\_MAX}$. Further, in instances where VCAP=$V_{OUT} \leq V^-_{CUTOFF}$=$V_{RAMP\_START}$, the activation output signal $AF_{OUT}$ will have a pulse duration $P_{DURATION}$ of zero since the output of the comparator circuitry 622 will remain at logic level 0 (e.g., GND). In this configuration, a $P_{DURATION}$ of zero encodes the minimum input value of −1.0 which corresponds to the negative voltage cutoff $V^+_{CUTOFF}$ 918 (e.g., value of −1.0). Moreover, in instances where $V_{OUT}$=$V_{PRECHARGE}$, the activation output signal $AF_{OUT}$ will have a pulse duration of one-half the maximum pulse duration ($P_{DURATION\_MAX}$/2) which encodes an activation output value of 0.5 based on input value of 0.

In other embodiments, the activation function circuitry 620 can be configured to implement a hard tanh activation function (e.g., FIG. 5D) using the same or similar techniques for the activation functions as discussed above in conjunction with FIGS. 7, 8, and 9. In such embodiments, the activation function circuitry 620 would be configured with an additional comparator circuit and ramp voltage signal (e.g., −$V_{RAMP}$) to process negative voltage inputs (x) and generate corresponding negative activation value outputs, the details of which are readily understood by those of ordinary skill in the art based on the teachings disclosed herein.

The exemplary analog-based RPU systems (such as shown in FIGS. 3 and 4) provide good performance as a result of the resilience of artificial neural networks to weight programming errors, which allows the use of imperfect resistive memory devices. However, analog-based systems are significantly less resilient to errors and imperfections of the neuron activation functions that are implemented in an artificial neural network. In this regard, inaccuracies in the hardware implementation of activation functions can result in the significant degradation of the classification/inference accuracy of a hardware artificial neural network. In the context of the exemplary embodiments of the hardware activation functions discussed above in conjunction with FIGS. 6, 7, 8, and 9, errors in the hardware-based activation functions can arise due to non-linearities of ramp voltage signals that are generated by the ramp voltage generator circuitry 624.

Figure 10:
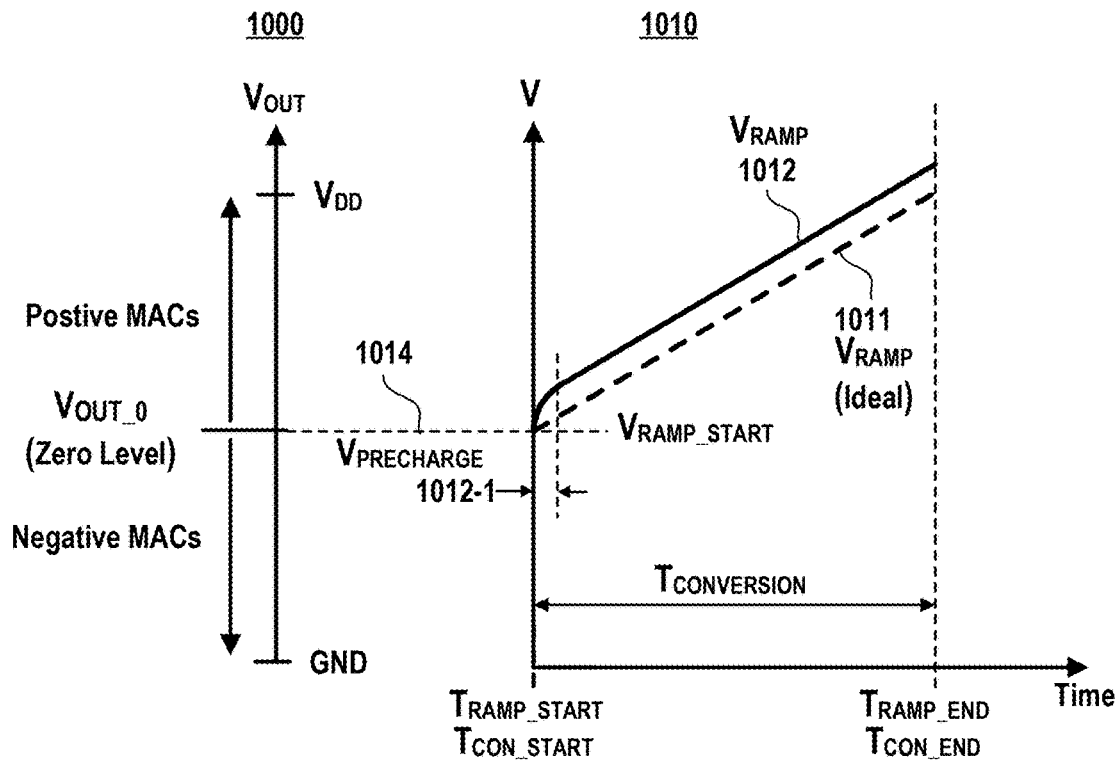
FIG. 10 schematically illustrates errors that can occur in the operation of a hardware-implemented activation function, according to an exemplary embodiment of the disclosure.

For example, FIG. 10 schematically illustrates errors that can occur in the operation of activation function circuitry due to non-linearities of a ramp voltage signal, according to an exemplary embodiment of the disclosure. In particular, FIG. 10 schematically illustrates a mapping 1000 of output voltages $V_{OUT}$ to a range of positive MAC values, a range of negative MAC values, and a zero MAC value, which is the same or similar to the mapping 700 discussed above in conjunction with FIG. 7. Further, FIG. 10 depicts a timing diagram 1010 which schematically illustrates an ideal linear ramp voltage $V_{RAMP}$ 1011 (illustrated by a dashed sloping line), and an actual linear ramp voltage $V_{RAMP}$ 1012 that is output from the ramp voltage generator circuitry 624 over a given period from a ramp voltage start time $T_{RAMP\_START}$ to a ramp voltage end time $T_{RAMP\_END}$. In addition, the timing diagram 1010 illustrates an exemplary conversion period $T_{CONVERSION}$ from a conversion start time $T_{CON\_START}$ to a conversion end time $T_{CON\_END}$.

As shown in FIG. 10, both the ideal linear ramp voltage $V_{RAMP}$ 1011 and the actual linear ramp voltage $V_{RAMP}$ 1012 have an initial voltage level $V_{RAMP\_START}$ which is equal to a precharge voltage level $V_{PRECHARGE}$ 1014 and which corresponds to the zero level MAC value ($V_{OUT\_0}$). The ideal linear ramp voltage $V_{RAMP}$ 1011 is shown to have a linearly increasing slope profile over the entire duration from the ramp voltage start time $T_{RAMP\_START}$ to the ramp voltage end time $T_{RAMP\_END}$. However, the linear ramp voltage $V_{RAMP}$ 1012 is shown to have an initial non-linear region 1012-1 in which the slope of the ramp voltage is non-linear. The non-linear region 1012-1 of the linear ramp voltage $V_{RAMP}$ 1012 leads to inaccuracies in the activation output signal that is generated by a given activation function implemented by, e.g., the activation function circuitry 620 (FIG. 6). For example, for a hardware-based ReLU activation function, for relatively small input values (e.g., small $V_{OUT}$ levels), the ReLU output will be zero. In other embodiments, depending on the hardware implementation, for input with zero values, the ReLU output can be non-zero values.

Figure 11:
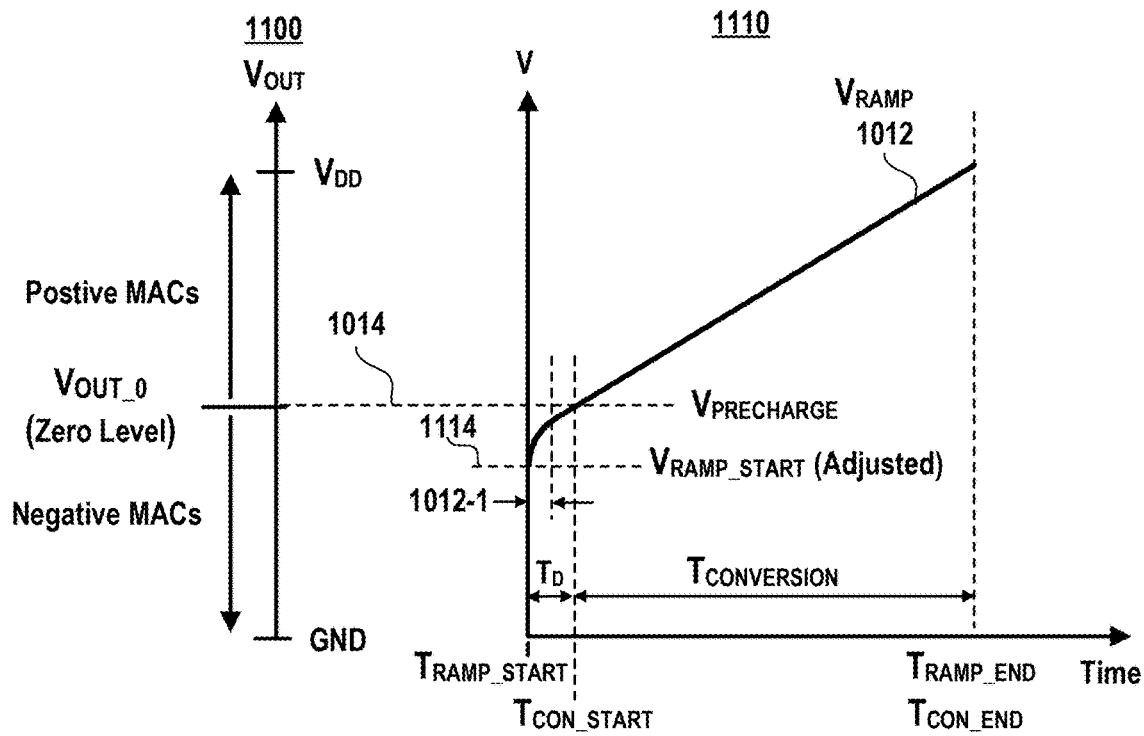
FIG. 11 schematically illustrates a method to reduce or eliminate the errors that can occur in the operation of a hardware-implemented activation function, according to an exemplary embodiment of the disclosure.
Figure 12:
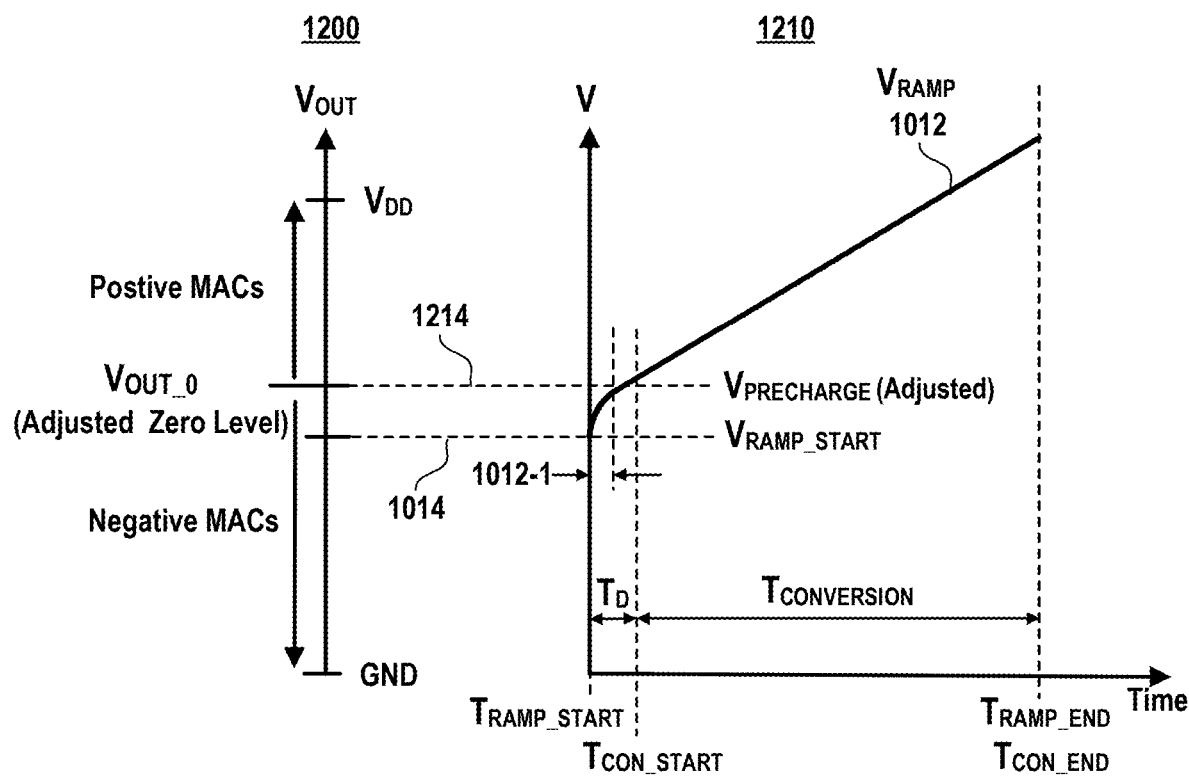
FIG. 12 schematically illustrates a method to reduce or eliminate the errors that can occur in the operation of a hardware-implemented activation function, according to another exemplary embodiment of the disclosure.

Exemplary embodiments of the disclosure provide techniques for mitigating or eliminating errors in the hardware-based activation functions that may arise due to non-linearities of the ramp voltage signal generated by the ramp voltage generator circuitry 624. In general, such techniques involve adjusting one or more parameters (e.g., voltage levels and/or timing) of the activation function circuitry 620 (FIG. 6) so that the conversion process is performed using the linear portion of the ramp voltage $V_{RAMP}$ 1012, while ignoring the initial non-linear region 1012-1 of the ramp voltage $V_{RAMP}$ 1012. For example, FIGS. 11 and 12 schematically illustrate methods to reduce or eliminate errors in a hardware-implemented activation function (e.g., ReLU activation function) due to non-linearities of a linear ramp voltage signal that is used for performing a conversion process, according to exemplary embodiments of the disclosure. As explained in further detail below, such techniques generally involve shifting the start time of the conversion period to be slightly later than the start time of the ramp voltage (and thus the integration start time for the next layer) to avoid any non-linear and transient behavior that can occur at the beginning of the ramp voltage (and thus at the beginning of the integration period for the next layer) and thereby provide a linear conversion.

In particular, FIG. 11 schematically illustrates a method for (i) adjusting a start time $T_{CON\_START}$ of the conversion period $T_{CONVERSION}$, and (ii) adjusting an initial ramp voltage level $V_{RAMP\_START}$, to reduce or eliminate errors in a hardware-implemented ReLU activation function due to non-linearities of a linear ramp voltage signal that is used for performing a conversation process, according to an exemplary embodiment of the disclosure. FIG. 11 schematically illustrates a mapping 1100 of output voltages $V_{OUT}$ to a range of positive MAC values, a range of negative MAC values, and a zero MAC value, which is the same or similar to the mapping 1000 shown in FIG. 10 (and discussed above in conjunction with FIG. 7). Further, FIG. 11 depicts a timing diagram 1110 which schematically illustrates the linear ramp voltage $V_{RAMP}$ 1012 that is output from the ramp voltage generator circuitry 624 over a given period from a ramp voltage start time $T_{RAMP\_START}$ to a ramp voltage end time $T_{RAMP\_END}$, wherein the linear ramp voltage $V_{RAMP}$ 1012 comprises the non-linear region 1012-1.

In addition, the timing diagram 1110 illustrates an exemplary configuration of the activation function circuitry in which (i) the precharge voltage level $V_{PRECHARGE}$ 1014 is configured to correspond to the zero-level MAC value ($V_{OUT\_0}$), (ii) an initial ramp voltage level $V_{RAMP\_START}$ 1114 is adjusted/set to a level that is less than the precharge voltage level $V_{PRECHARGE}$ 1014, and (ii) the start time $T_{CON\_START}$ of the conversion period $T_{CONVERSION}$ time is adjusted/set to be later than the ramp voltage start time $T_{RAMP\_START}$. With this exemplary configuration, the start of the conversion period $T_{CONVERSION}$ is delayed for specified amount of time (denoted, delay time TD) following the ramp voltage start time $T_{RAMP\_START}$.

More specifically, as shown in FIG. 11, in some embodiments, the start time $T_{CON\_START}$ of the conversion period $T_{CONVERSION}$ is delayed by a specified delay time TD (e.g., on the order of 10's of nanoseconds) relative to the ramp voltage start time $T_{RAMP\_START}$, wherein the delay time TD is sufficient to ignore the non-linear region 1012-1 of the ramp voltage $V_{RAMP}$ 1012 and only utilize a linear region of the ramp voltage $V_{RAMP}$ 1012 to perform a conversion process during the conversion period $T_{CONVERSION}$. In addition, as shown in FIG. 11, the start time $T_{CON\_START}$ of the conversion period $T_{CONVERSION}$ is set to coincide with the time at which the voltage level of the linear ramp voltage $V_{RAMP}$ 1012 is equal to, or substantially equal to, the precharge voltage level $V_{PRECHARGE}$ 1014. In this configuration, the conversion process, which is performed by the comparator circuitry 622 to compute the activation function output $AF_{OUT}$, begins at the time when the voltage level of the linear ramp voltage $V_{RAMP}$ 1012 corresponds to the zero-level MAC value ($V_{OUT\_0}$). In other words, the start time of the conversion process is aligned to the zero-level crossing of the linear ramp voltage $V_{RAMP}$ 1012, which allows the conversion process to be more accurately performed using only a linear region of the linear ramp voltage $V_{RAMP}$ 1012.

Next, FIG. 12 schematically illustrates a method for (i) adjusting a start time $T_{CON\_START}$ of the conversion period $T_{CONVERSION}$, and (ii) adjusting the precharge voltage level $V_{PRECHARGE}$ and thus adjusting the zero-level MAC value ($V_{OUT\_0}$), to reduce or eliminate errors in a hardware-implemented ReLU activation function due to non-linearities of a linear ramp voltage signal that is used for performing a conversation process, according to an exemplary embodiment of the disclosure. FIG. 12 schematically illustrates a mapping 1200 of output voltages $V_{OUT}$ to a range of positive MAC values, a range of negative MAC values, and a zero MAC value, which is the same or similar to the mapping 1000 shown in FIG. 10, but wherein the precharge voltage level $V_{PRECHARGE}$ 1014 (in FIG. 10) is increased to a higher precharge voltage level $V_{PRECHARGE}$ 1214. In this configuration, the mapping 1200 of output voltages $V_{OUT}$ is adjusted to set a new $V_{OUT}$ value which maps to the zero-level MAC value ($V_{OUT\_0}$).

Further, FIG. 12 depicts a timing diagram 1210 which schematically illustrates the linear ramp voltage $V_{RAMP}$ 1012 that is output from the ramp voltage generator circuitry 624 over a given period from a ramp voltage start time $T_{RAMP\_START}$ to a ramp voltage end time $T_{RAMP\_END}$, wherein the linear ramp voltage $V_{RAMP}$ 1012 comprises the non-linear region 1012-1. In this configuration, the initial ramp voltage level $V_{RAMP\_START}$ 1014 remains set to the original precharge voltage level (and corresponding original zero-level MAC value ($V_{OUT\_0}$) (similar to FIG. 10). In addition, the timing diagram 1210 illustrates an exemplary configuration of the activation function circuitry in which (i) the adjusted precharge voltage level $V_{PRECHARGE}$ 1214 corresponds to the adjusted zero-level MAC value ($V_{OUT\_0}$), and (ii) the start time $T_{CON\_START}$ of the conversion period $T_{CONVERSION}$ time is adjusted/set to be later than the ramp voltage start time $T_{RAMP\_START}$. With this exemplary configuration, the start of the conversion period $T_{CONVERSION}$ is delayed for specified amount of time TD following the ramp voltage start time $T_{RAMP\_START}$.

More specifically, as shown in FIG. 12, in some embodiments, the start time $T_{CON\_START}$ of the conversion period $T_{CONVERSION}$ is delayed by a specified delay time TD (e.g., on the order of 10's of nanoseconds) relative to the ramp voltage start time $T_{RAMP\_START}$. Similar to the exemplary configuration shown in FIG. 11, the delay time TD is sufficient to ignore the non-linear region 1012-1 of the ramp voltage $V_{RAMP}$ 1012 and only utilize a linear region of the ramp voltage $V_{RAMP}$ 1012 to perform a conversion process during the conversion period $T_{CONVERSION}$. In addition, as shown in FIG. 12, the start time $T_{CON\_START}$ of the conversion period $T_{CONVERSION}$ is adjusted/set to coincide with the time at which the voltage level of the linear ramp voltage $V_{RAMP}$ 1012 is equal to, or substantially equal to, the adjusted precharge voltage level $V_{PRECHARGE}$ 1214.

In this configuration, the conversion process, which is performed by the comparator circuitry 622 to compute the activation function output $AF_{OUT}$, begins at the time when the voltage level of the linear ramp voltage $V_{RAMP}$ 1012 corresponds to the adjusted zero-level MAC value ($V_{OUT\_0}$). In other words, the start time of the conversion process is aligned to the adjusted zero-level crossing of the linear ramp voltage $V_{RAMP}$ 1012, which allows the conversion process to be more accurately performed using only a linear region of the ramp voltage $V_{RAMP}$ 1012.

In this regard, it is to be noted that the exemplary configurations shown in FIGS. 11 and 12 are similar with regard to delaying the start time $T_{CON\_START}$ of the conversion period $T_{CONVERSION}$ relative to the start time $V_{RAMP\_START}$ of the ramp voltage $V_{RAMP}$, while ensuring that the delayed start time of the conversion period coincides with the time at which the voltage level of the linear ramp voltage $V_{RAMP}$ 1012 is equal to, or substantially equal to, the precharge voltage level $V_{PRECHARGE}$ (e.g., for ReLU and clamped ReLU activation functions). The exemplary configuration of FIGS. 11 and 12 differ in that, e.g., in FIG. 11 the initial ramp voltage level $V_{RAMP\_START}$ is adjusted (e.g., the initial ramp voltage level $V_{RAMP\_START}$ is decreased relative to the precharge voltage level $V_{PRECHARGE}$), whereas in FIG. 12 the precharge voltage level $V_{PRECHARGE}$ is adjusted (e.g., the precharge voltage level $V_{PRECHARGE}$ is increased relative to the initial ramp voltage level $V_{RAMP\_START}$). In other embodiments, both the initial ramp voltage level $V_{RAMP\_START}$ and the precharge voltage level $V_{PRECHARGE}$ are adjusted (e.g., the initial ramp voltage level $V_{RAMP\_START}$ is slightly decreased, and the precharge voltage level $V_{PRECHARGE}$ is slightly increased). Further, while FIGS. 11 and 12 illustrate methods for adjusting the operating parameters for hardware-implemented ReLU and clamped ReLU activation functions (e.g., FIGS. 7 and 8), the same or similar techniques can be utilized for adjusting the operating parameters of for hardware-implemented hard sigmoid activation functions (e.g., FIG. 9) and hard tanh activation functions, as is readily understood by those of ordinary skill in the art based on the teachings herein.

Exemplary embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
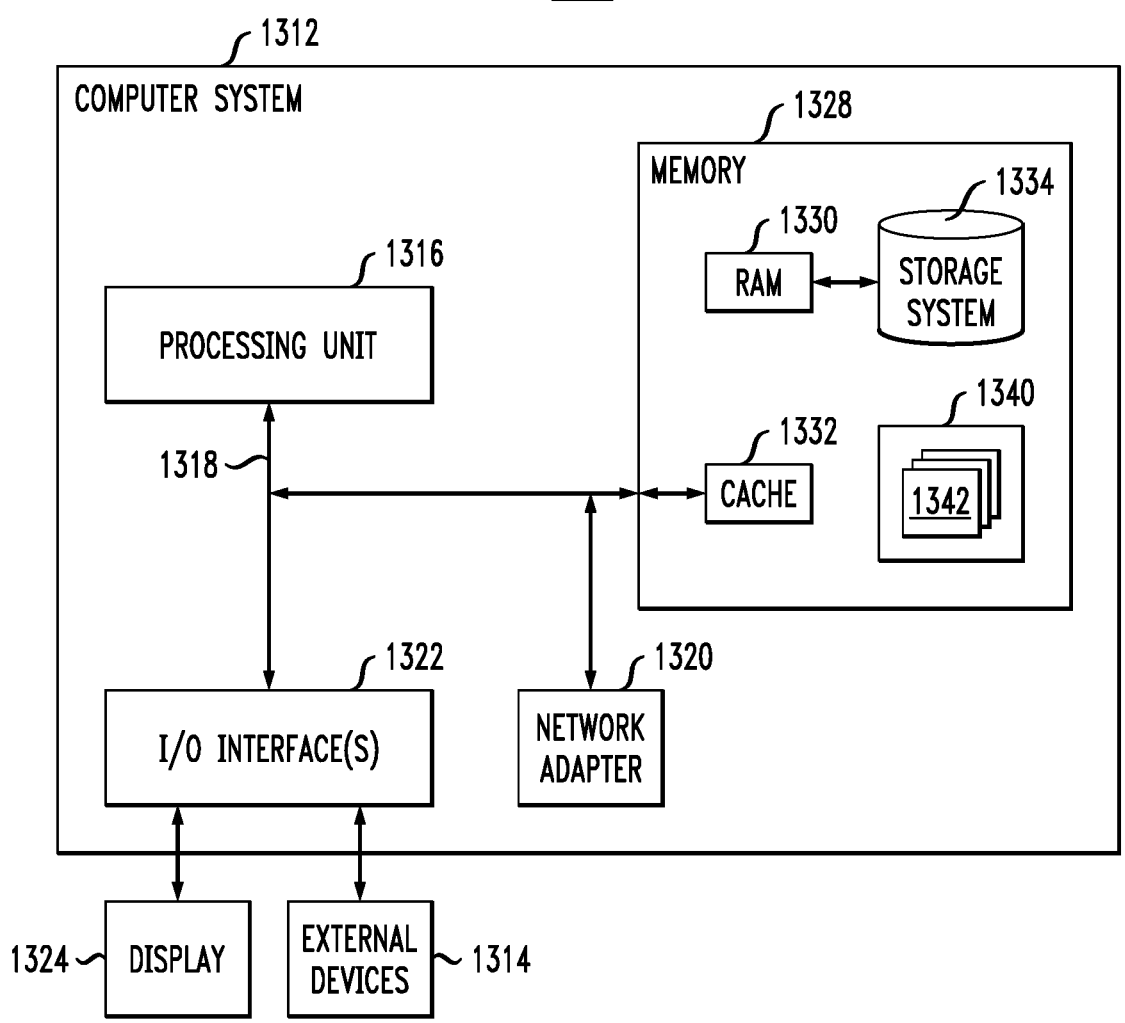
FIG. 13 schematically illustrates an exemplary architecture of a computing node which can host the computing system of FIG. 1, according to an exemplary embodiment of the disclosure.

These concepts are illustrated with reference to FIG. 13, which schematically illustrates an exemplary architecture of a computing node that can host the computing system of FIG. 1, according to an exemplary embodiment of the disclosure. FIG. 13 illustrates a computing node 1300 which comprises a computer system/server 1312, which is operational with numerous other general purpose or special purpose computing system environments or configurations. Examples of well-known computing systems, environments, and/or configurations that may be suitable for use with computer system/server 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1312 may be practiced in distributed cloud computing environments where tasks are performed by remote processing devices that are linked through a communications network. In a distributed cloud computing environment, program modules may be located in both local and remote computer system storage media including memory storage devices.

In FIG. 13, computer system/server 1312 in computing node 1300 is shown in the form of a general-purpose computing device. The components of computer system/server 1312 may include, but are not limited to, one or more processors or processing units 1316, a system memory 1328, and a bus 1318 that couples various system components including system memory 1328 to the processors 1316.

The bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1312 typically includes a variety of computer system readable media. Such media may be any available media that is accessible by computer system/server 1312, and it includes both volatile and non-volatile media, removable and non-removable media.

The system memory 1328 can include computer system readable media in the form of volatile memory, such as random-access memory (RAM) 1330 and/or cache memory 1332. The computer system/server 1312 may further include other removable/non-removable, volatile/nonvolatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1318 by one or more data media interfaces. As depicted and described herein, memory 1328 may include at least one program product having a set (e.g., at least one) of program modules that are configured to carry out the functions of embodiments of the invention.

The program/utility 1340, having a set (at least one) of program modules 1342, may be stored in memory 1328 by way of example, and not limitation, as well as an operating system, one or more application programs, other program modules, and program data. Each of the operating system, one or more application programs, other program modules, and program data or some combination thereof, may include an implementation of a networking environment. Program modules 1342 generally carry out the functions and/or methodologies of embodiments of the disclosure as described herein.

Computer system/server 1312 may also communicate with one or more external devices 1314 such as a keyboard, a pointing device, a display 1324, etc., one or more devices that enable a user to interact with computer system/server 1312, and/or any devices (e.g., network card, modem, etc.) that enable computer system/server 1312 to communicate with one or more other computing devices. Such communication can occur via Input/Output (I/O) interfaces 1322. Still yet, computer system/server 1312 can communicate with one or more networks such as a local area network (LAN), a general wide area network (WAN), and/or a public network (e.g., the Internet) via network adapter 1320. As depicted, network adapter 1320 communicates with the other components of computer system/server 1312 via bus 1318. It should be understood that although not shown, other hardware and/or software components could be used in conjunction with computer system/server 1312. Examples, include, but are not limited to: microcode, device drivers, redundant processing units, external disk drive arrays, RAID systems, SSD drives, and data archival storage systems, etc.

Additionally, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
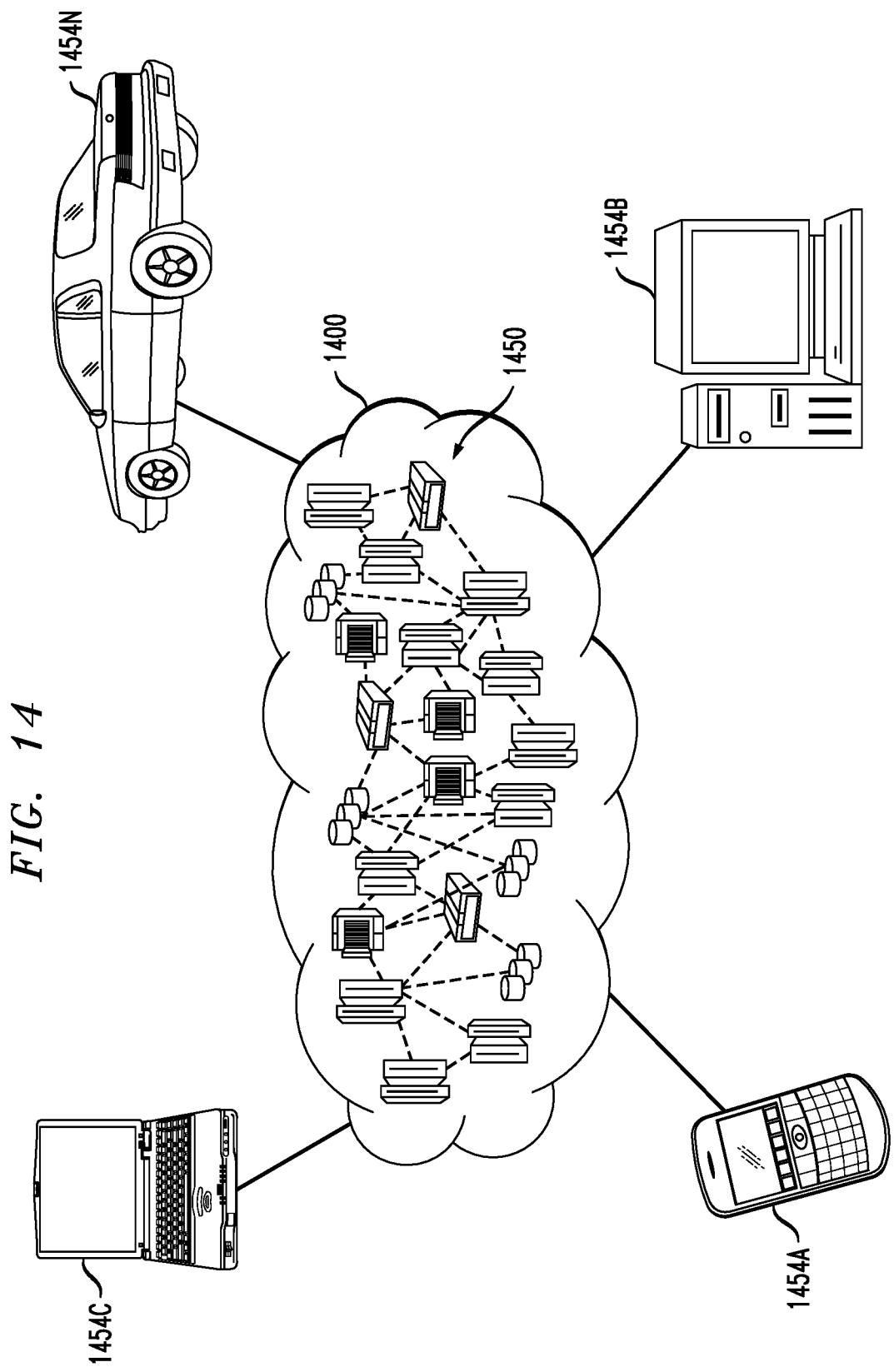
FIG. 14 depicts a cloud computing environment according to an exemplary embodiment of the disclosure.

Referring now to FIG. 14, illustrative cloud computing environment 1400 is depicted. As shown, cloud computing environment 1400 includes one or more cloud computing nodes 1450 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1450 may communicate with one another. They may be grouped (not shown) physically or virtually, in one or more networks, such as Private, Community, Public, or Hybrid clouds as described hereinabove, or a combination thereof. This allows cloud computing environment 1400 to offer infrastructure, platforms and/or software as services for which a cloud consumer does not need to maintain resources on a local computing device. It is understood that the types of computing devices 1454A-N shown in FIG. 14 are intended to be illustrative only and that computing nodes 1450 and cloud computing environment 1400 can communicate with any type of computerized device over any type of network and/or network addressable connection (e.g., using a web browser).

Figure 15:
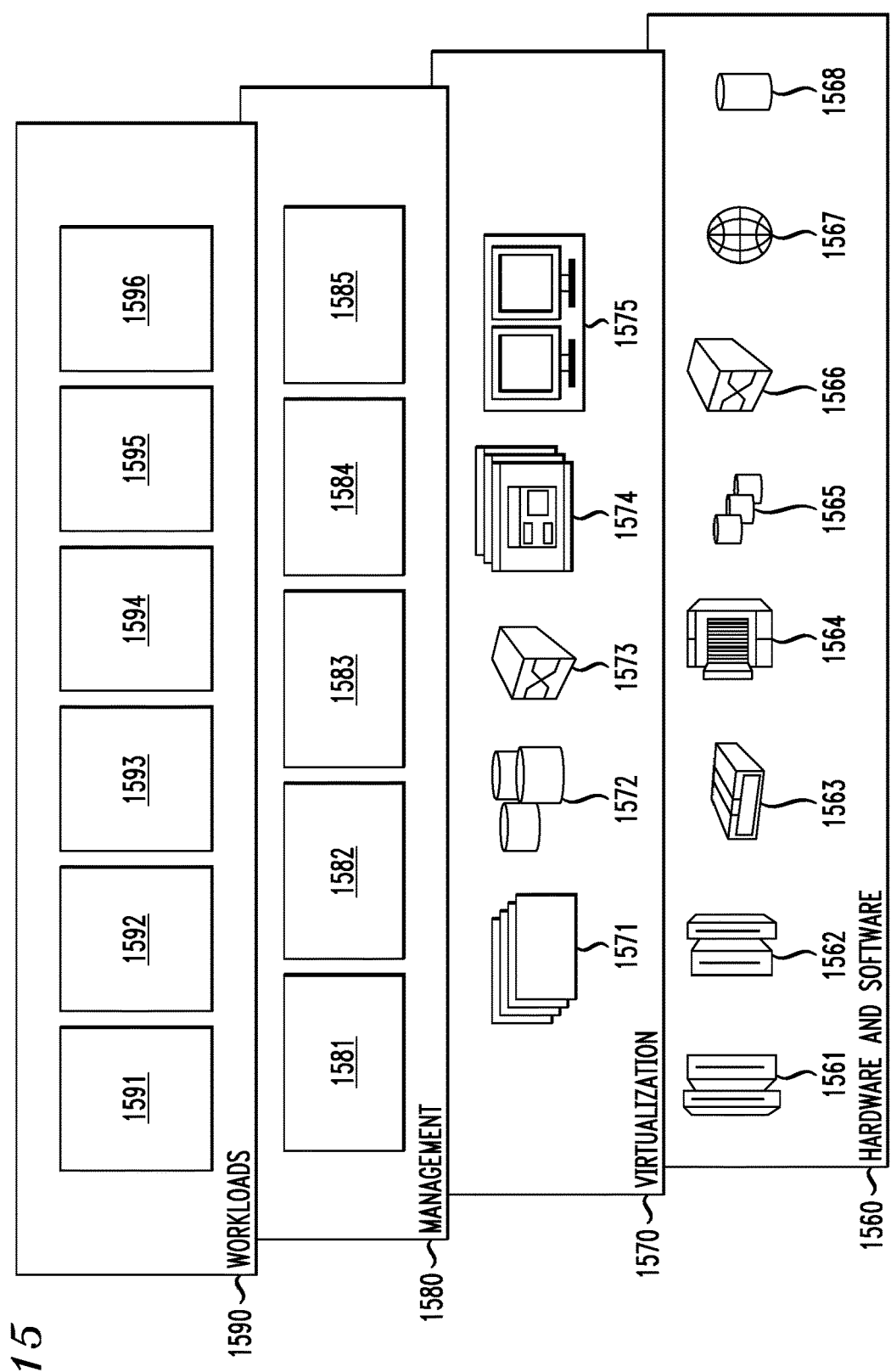
FIG. 15 depicts abstraction model layers according to an exemplary embodiment of the disclosure.

Referring now to FIG. 15, a set of functional abstraction layers provided by cloud computing environment 1400 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1560 includes hardware and software components. Examples of hardware components include: mainframes 1561; RISC (Reduced Instruction Set Computer) architecture based servers 1562; servers 1563; blade servers 1564; storage devices 1565; and networks and networking components 1566. In some embodiments, software components include network application server software 1567 and database software 1568.

Virtualization layer 1570 provides an abstraction layer from which the following examples of virtual entities may be provided: virtual servers 1571; virtual storage 1572; virtual networks 1573, including virtual private networks; virtual applications and operating systems 1574; and virtual clients 1575.

In one example, management layer 1580 may provide the functions described below. Resource provisioning 1581 provides dynamic procurement of computing resources and other resources that are utilized to perform tasks within the cloud computing environment. Metering and Pricing 1582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1583 provides access to the cloud computing environment for consumers and system administrators. Service level management 1584 provides cloud computing resource allocation and management such that required service levels are met. Service Level Agreement (SLA) planning and fulfillment 1585 provide pre-arrangement for, and procurement of, cloud computing resources for which a future requirement is anticipated in accordance with an SLA.

Workloads layer 1590 provides examples of functionality for which the cloud computing environment may be utilized. Examples of workloads and functions which may be provided from this layer include: mapping and navigation 1591; software development and lifecycle management 1592; virtual classroom education delivery 1593; data analytics processing 1594; transaction processing 1195; and various functions 1596 for performing hardware accelerated computing computations using an RPU system with RPU arrays, wherein such computations include, but are not limited to, hardware matrix-vector multiplication operations, neural network training operations, hardware activation function computations, etc., based on the exemplary methods and functions discussed above in conjunction with, e.g., FIGS. 7, 8, 9, 10, 11, and 12. Furthermore, in some embodiments, the hardware and software layer 1560 would include, e.g., the computing system 100 of FIG. 1, the RPU compute node 200 of FIG. 2, etc., to implement or otherwise support the various workloads and functions 1596 for performing such hardware accelerated computing (e.g., hardware-based AI computing), analog in-memory computations, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:
    activation function circuitry configured to implement a non-linear activation function; and
    control circuitry configured to generate control signals for configuring the activation function circuitry to implement the non-linear activation function;
    wherein the activation function circuitry comprises:
    a comparator circuit comprising a first input terminal, a second input terminal, and an output terminal;
    a capacitor which comprises a terminal coupled to the first input terminal of the comparator circuit, wherein the capacitor is configured to receive and store an input voltage which corresponds to an input value to the non-linear activation function; and
    a ramp voltage generator circuit configured by the control circuitry to generate a ramp voltage which is applied to the second input terminal of the comparator circuit;
    wherein the comparator circuit is configured by the control circuitry to compare, during a conversion period, the stored input voltage to the ramp voltage, and generate a voltage pulse on the output terminal based on a result of the comparing during the conversion period, wherein the voltage pulse comprises a pulse duration which encodes an activation output value of the non-linear activation function based on the input value to the non-linear activation function.

2. The device of claim 1, wherein the control circuitry delays a start time of the conversion period for a configurable amount of delay time following a ramp voltage start time at which the ramp voltage is applied to the second input terminal of the comparator circuit.

3. The device of claim 2, wherein the delayed start time of the conversion period coincides with a time at which a voltage level of the ramp voltage corresponds to an input value of zero to the non-linear activation function.

4. The device of claim 1, wherein the control circuitry configures a start time and duration of the conversion period by enabling and disabling operation of the comparator circuit.

5. The device of claim 1, further comprising a precharge circuit which is configured by the control circuitry to precharge the capacitor to a voltage level which corresponds to an input value of zero to the non-linear activation function, prior to a start of the conversion period.

6. The device of claim 1, wherein the ramp voltage generator circuit comprises a configurable circuit in which an initial voltage level of the ramp voltage generated by the ramp voltage generator circuit is adjustable to one of (i) a voltage level which corresponds to an input value of zero to the non-linear activation function, and (ii) a voltage level which corresponds to a negative input value to the non-linear activation function.

7. The device of claim 1, wherein the activation function circuitry is configured by the control circuitry to implement a rectified linear unit activation function.

8. The device of claim 1, wherein the activation function circuitry is configured by the control circuitry to implement a clamped rectified linear unit activation function.

9. The device of claim 1, wherein the activation function circuitry is configured by the control circuitry to implement a hard sigmoid activation function.

10. The device of claim 1, wherein the activation function circuitry is configured by the control circuitry to implement a hard hyperbolic tangent activation function.

11. The device of claim 1, further comprising a current integrator circuit which is configured by the control circuitry to generate the input voltage that is stored by the capacitor of the activation function circuitry.

12. A system, comprising:
    a neuromorphic computing system comprising an artificial neural network, wherein the artificial neural network comprises at least one neuron layer comprising artificial neurons, wherein at least one artificial neuron comprises activation function circuitry configured to implement a non-linear activation function; and
    control circuitry configured to generate control signals for configuring the activation function circuitry to implement the non-linear activation function;
    wherein the activation function circuitry comprises:
    a comparator circuit comprising a first input terminal, a second input terminal, and an output terminal;
    a capacitor which comprises a terminal coupled to the first input terminal of the comparator circuit, wherein the capacitor is configured to receive and store an input voltage which corresponds to an input value to the non-linear activation function; and
    a ramp voltage generator circuit configured by the control circuitry to generate a ramp voltage which is applied to the second input terminal of the comparator circuit;
    wherein the comparator circuit is configured by the control circuitry to compare, during a conversion period, the stored input voltage to the ramp voltage, and generate a voltage pulse on the output terminal based on a result of the comparing during the conversion period, wherein the voltage pulse comprises a pulse duration which encodes an activation output value of the non-linear activation function based on the input value to the non-linear activation function.

13. The system of claim 12, wherein the activation function circuitry further comprises a precharge circuit which is configured by the control circuitry to precharge the capacitor to a voltage level which corresponds to an input value of zero to the non-linear activation function, prior to a start of the conversion period.

14. The system of claim 12, wherein the control circuitry controls timing operations of the activation function circuitry and configures operating parameters of the ramp voltage generator circuit, to configure the activation function circuitry to implement one of a rectified linear unit activation function, a clamped rectified linear unit activation function, a hard sigmoid activation function, and a hard hyperbolic tangent activation function.

15. The system of claim 14, wherein the control circuitry controls operations of the comparator circuit and the ramp voltage generator circuit to delay a start time of the conversion period for a configurable amount of delay time following a ramp voltage start time at which the ramp voltage is applied to the second input terminal of the comparator circuit, wherein the delayed start time of the conversion period coincides with a time at which a voltage level of the ramp voltage corresponds to an input value of zero to the non-linear activation function.

16. The system of claim 14, wherein the ramp voltage generator circuit comprises a configurable circuit in which an initial voltage level of the ramp voltage generated by the ramp voltage generator circuit is adjustable by the control circuitry to one of (i) a voltage level which corresponds to an input value of zero to the non-linear activation function, and (ii) a voltage level which corresponds to a negative input value to the non-linear activation function.

17. A method, comprising:
configuring a hardware circuit to perform a non-linear activation function computation, the hardware circuit comprising a capacitor, a ramp voltage generator circuit, and a comparator circuit;

wherein configuring the hardware circuit to perform the non-linear activation function computation, comprises:
causing the capacitor to store an input voltage, wherein the input voltage corresponds to an input value for the non-linear activation function computation;
causing the ramp voltage generator circuit to generate a ramp voltage; and
causing the comparator circuit to compare the input voltage stored by the capacitor to the ramp voltage during a during a conversion period, to thereby generate a voltage pulse at an output of the comparator circuit based on a result of the comparing during the conversion period;
wherein the voltage pulse comprises a pulse duration which encodes an output value of the non-linear activation function computation based on the input value for the non-linear activation function computation.

18. The method of claim 17, wherein configuring the hardware circuit to perform the non-linear activation function computation further comprises causing the capacitor to be precharged to a voltage level which corresponds to an input value of zero to the non-linear activation function computation, prior to a start of the conversion period.

19. The method of claim 17, wherein configuring the hardware circuit to perform the non-linear activation function computation further comprises causing the comparator circuit to delay a start time of the conversion period for a configurable amount of time following a ramp voltage start time at which the ramp voltage is output from the ramp voltage generator circuit, wherein the delayed start time of the conversion period coincides with a time at which a voltage level of the ramp voltage corresponds to an input value of zero to the non-linear activation function computation.

20. The method of claim 17, wherein the hardware circuit is configurable to perform one of a rectified linear unit activation function, a clamped rectified linear unit activation function, a hard sigmoid activation function, and a hard hyperbolic tangent activation function.

* * * * *